(12) United States Patent
Lee et al.

(10) Patent No.: US 11,078,831 B2
(45) Date of Patent: Aug. 3, 2021

(54) VEHICLE SUPERCHARGING SYSTEM AND CONTROL METHOD THEREOF

(71) Applicants: HYUNDAI MOTOR COMPANY, Seoul (KR); KIA MOTORS CORPORATION, Seoul (KR)

(72) Inventors: Sueng Ho Lee, Seoul (KR); Yunsung So, Hwaseong-si (KR); Ki Tae Kim, Incheon (KR); Changgi Yeo, Suwon-si (KR); Jekee Lee, Anyang-si (KR); Han Ki Hong, Seongnam-si (KR); Ki Been Lim, Yongin-si (KR); Dong Hee Han, Seongnam-si (KR); Seungwoo Hong, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 16/906,249

(22) Filed: Jun. 19, 2020

(65) Prior Publication Data
US 2021/0115842 A1 Apr. 22, 2021

(30) Foreign Application Priority Data
Oct. 21, 2019 (KR) .......................... 10-2019-0130654

(51) Int. Cl.
| F02B 37/16 | (2006.01) |
| F02B 39/10 | (2006.01) |
| F16H 57/02 | (2012.01) |
| F02B 37/18 | (2006.01) |
| F16H 57/04 | (2010.01) |

(52) U.S. Cl.
CPC .......... *F02B 37/164* (2013.01); *F02B 37/162* (2019.05); *F02B 37/183* (2013.01); *F02B 39/10* (2013.01); *F16H 57/02* (2013.01); *F16H 57/0416* (2013.01); *F16H 2057/02047* (2013.01)

(58) Field of Classification Search
CPC ...... F02B 37/164; F02B 39/10; F02B 37/162; F02B 37/183; F16H 57/02; F16H 57/0416; F16H 2057/02047
See application file for complete search history.

(56) References Cited

U.S. PATENT DOCUMENTS 8,869,757 B2 * 10/2014 Kim .................... F02B 29/0443
123/41.31

FOREIGN PATENT DOCUMENTS

JP      2020-007931 A     1/2020

* cited by examiner

*Primary Examiner* — Audrey K Bradley
*Assistant Examiner* — Edward Bushard
(74) *Attorney, Agent, or Firm* — Brinks Gilson & Lione

(57) ABSTRACT

A vehicle supercharging system may include: an engine; a transmission; a dual-turbine electric supercharger that compresses air and has a first turbine and a second turbine; an engine-side supercharging path part that branches out from an air supplying line configured to supply air to the engine, passes through the first turbine and then joins into the air supplying line; a transmission-side supercharging path part that sucks air separately from the engine-side air supplying line, passes through the second turbine, and then supplies compressed air to the transmission; and a controller that operates the dual-turbine electric supercharger according to a driving state of a vehicle and that individually controls valves provided in the engine-side supercharging path part and the transmission-side supercharging path part.

20 Claims, 17 Drawing Sheets

VEHICLE SUPERCHARGING SYSTEM AND CONTROL METHOD THEREOF

CROSS-REFERENCE TO RELATED APPLICATION

This application claims priority to and the benefit of Korean Patent Application No. 10-2019-0130654, filed on Oct. 21, 2019, the entire contents of which are incorporated herein by reference.

FIELD

The present disclosure relates to a vehicle supercharging system and a control method thereof. More particularly, the present disclosure relates to a vehicle supercharging system and a control method thereof that may improve cooling and warming performance of an automatic transmission applied to a vehicle.

BACKGROUND

The statements in this section merely provide background information related to the present disclosure and may not constitute prior art.

Generally, when a transmission using a dry/wet launch friction clutch is applied to a vehicle, a conventional cooling method, such as a natural air cooling method or a combination of the natural air cooling method and a forced oil cooling method, is used.

Such a cooling method has good cooling performance in a high speed driving condition of a vehicle, but cooling performance by the natural air cooling method may be relatively reduced in a low speed or a stop condition.

For example, when a vehicle abnormally creeps for a long time on a flat road or a hill, or repeatedly goes and stops at a low speed, the number of slips of the friction clutch increases, so that the clutch may be rapidly overheated while being driven.

When a vehicle continues to be driven in a state in which the clutch is overheated, the clutch may deteriorate, which may adversely affect performance and durability.

In addition, when the clutch is heated at a high temperature and this abnormal harsh condition is maintained, the abnormal harsh condition may deteriorate driving performance of a vehicle, and thus more advanced cooling performance is desired.

In addition, the transmission of the conventional vehicle is not provided with a separate warming device for preheating for better engine starting in an extremely low temperature environment.

Therefore, when a clutch oil temperature and a temperature of bearing parts may not be quickly increased in an extremely low temperature situation, frictional drag increase in clutch related parts and a transmission oil may be disadvantageous to vehicle fuel efficiency and performance.

In addition, in a case of a wet clutch, a method of increasing the oil temperature of the transmission through forced friction control may be considered, but the method may adversely affect clutch performance and durability, and may also deteriorate vehicle driving performance.

Therefore, in applying an automatic transmission using a launch clutch to a vehicle, an excellent cooling method for improving clutch cooling and warming performance is desired.

The above information disclosed in this Background section is only for enhancement of understanding of the background of the present disclosure, and therefore it may contain information that does not form the prior art that is already known in this country to a person of ordinary skill in the art.

SUMMARY

The present disclosure provides a vehicle supercharging system and a control method thereof that may improve clutch cooling and warming performance of a launch friction clutch automatic transmission applied to a vehicle under all driving conditions.

A vehicle supercharging system according to an exemplary form of the present disclosure may include an engine generating power according to combustion of a fuel; a transmission including at least one friction clutch; a dual-turbine electric supercharger that compresses air by rotational force of a motor and includes a first turbine and a second turbine; an engine-side supercharging path part branching off from an air supplying line that supplies air to the engine, passing through the first turbine of the electric supercharger, and then joining into the air supplying line; a transmission-side supercharging path part that sucks air separately from the engine-side air supplying line, passes through the second turbine of the dual-turbine electric supercharger, and then supplies compressed air to the transmission; and a controller that operates the dual-turbine electric supercharger according to a driving state of a vehicle and that individually controls the engine-side supercharging path part for boosting the engine and the transmission-side supercharging path part for cooling or warming the transmission through control of valves provided in the engine-side supercharging path part and the transmission-side supercharging path part.

The transmission may be a dual clutch transmission (DCT), an automatic manual transmission (AMT), or a manual transmission (MT).

The transmission may be provided with an air circulating channel formed around a clutch drum inside a transmission housing in a circumferential direction, and an inlet of the air circulating channel is connected to the transmission-side supercharging path part.

The first turbine and the second turbine may share a stator and a rotor in a housing, and rotate at the same speed.

A compression ratio of the first turbine may be greater than a compression ratio of the second turbine.

The engine-side supercharging path part may include a first bypass line L1 branching off from the air supplying line and joining into an inlet of the first turbine; a first bypass valve V1 installed at the first bypass line L1 and operated in an open or closed state; a second bypass line connecting an outlet of the second turbine and the air supplying line; and a second bypass valve V2 installed in the second bypass line L2 and operated in an open or closed state, wherein the second bypass valve V2 is a two-way valve or a three-way valve, and when the second bypass valve V2 is the two-way valve, a back-flow prevention valve V5 for preventing back-flow is installed in the air supplying line.

The transmission-side supercharging path part may include a first transmission-side supply line L3 that sucks air separately from the engine-side air supplying line and is connected to an inlet of the second turbine of the dual-turbine electric supercharger; a first transmission-side air supplying valve V3 installed at the first transmission-side air supplying line L3 to operate in an open or closed state; a second transmission-side air supplying line L4 connecting an outlet of the second turbine to an inlet of the transmission;

and a second transmission-side air supplying valve V4 installed at the second transmission-side air supplying line L4 to operate in an open or closed state.

The first transmission-side supply line L3 may be provided with a transmission air cleaner that purifies impurities in air flowing into the transmission side.

The second transmission-side air supplying line L4 may be provided with a bypass hole formed so that air in the transmission is discharged to the outside when the second transmission-side air supplying valve V4 is blocked.

The second transmission-side supply line L4 may be installed with a transmission cooler that cools air that is compressed and heated by the dual-turbine electric supercharger.

The second transmission-side supply line L4 may fluidly communicate with the air circulating channel formed inside the transmission housing, and at least one nozzle that ejects air to the outside of the transmission housing may be formed at an end portion of the second transmission-side supply line L4.

The vehicle supercharging system according to an exemplary form of the present disclosure may further include a turbocharger which compresses air introduced from the outside by exhaust force of the engine and supplies the compressed air to the air supplying line; a cooler installed in the air supplying line to cool air heated by air compression of at least one of the turbocharger and the dual-turbine electric supercharger; and a driving information detector that collects various driving information desired for controlling a supercharging path of the vehicle from sensors according to driving of the vehicle.

The dual-turbine electric supercharger may further compress air that is compressed by the turbocharger.

The controller may include a driving state analyzer that analyzes a driving state of the vehicle based on the driving information to determine whether at least one of an engine boosting control condition, a transmission cooling control condition, and a transmission warming control condition is satisfied; an electric supercharger controller that starts an operation of the dual-turbine electric supercharger when one of the control conditions is satisfied; a valve controller that controls a bypass valve for connecting the engine-side supercharging path part or the transmission-side supercharging path part in synchronization with an operation time of the dual-turbine electric supercharger; and an integrated controller that controls operations of the driving state analyzer, the electric supercharger controller, and the valve controller by applying a control signal for connecting a supercharging path corresponding to the satisfied control condition.

In another form of the present disclosure, a control method of a vehicle supercharging system that supplies air to an engine and a transmission by using a dual-turbine electric supercharger may include steps of: a) determining, by a controller, whether at least one of an engine boosting control condition, a transmission cooling control condition, or a transmission warming control condition are satisfied according to a driving state of a vehicle; b) when the engine boosting control condition is satisfied, operating, by the controller, the dual-turbine electric supercharger, and supplying air through an engine-side supercharging path part that is bypassed in an air supplying line supplying air to the engine through valve control and then passing it through a first turbine of the dual-turbine electric supercharger; and c) when the transmission cooling control condition or the transmission warming control condition is satisfied, operating, by the controller, the dual-turbine electric supercharger, and connecting, by the controller, a transmission-side supercharging path part that sucks air separately from the engine-side air supplying line through valve control and passes it through a second turbine of the dual-turbine electric supercharger.

The step a) may include determining that the engine boosting control condition is satisfied when an increase rate of an accelerator pedal operation signal corresponds to a launch condition that exceeds a predetermined threshold or a re-acceleration condition while driving; determining that the transmission cooling control condition is satisfied when operational signals of an accelerator pedal and a brake pedal are repeated for a predetermined time or when a transmission temperature exceeds a threshold temperature while the vehicle is driven at a low speed; and determining that the transmission warming control condition is satisfied when an outside temperature when a cold starting of the vehicle is equal to or lower than a predetermined temperature, or when a transmission temperature when the cold starting of the engine is less than a temperature threshold.

The step c) may include controlling all bypass valves installed in the transmission-side supercharging path part to be opened and controlling all bypass valves installed in the engine-side supercharging path part to be closed.

The step a) may include controlling all valves installed in the engine-side supercharging path part to be opened and all valves installed in the transmission-side supercharging path part to be opened when the engine boosting control condition and the transmission cooling or warming control condition are simultaneously satisfied.

A vehicle supercharging system according to another exemplary form of the present disclosure may include: an engine generating power according to combustion of a fuel; a transmission including at least one friction clutch; a dual-turbine electric supercharger that compresses air by rotational force of a motor and have a first turbine and a second turbine; an air cleaner filter that is divided into an engine-side air cleaner filter and a transmission-side air cleaner filter and into which external air is introduced; an engine-side supercharging path part that branches from an air supplying line connected to the engine-side air cleaner filter and passes through the electric supercharger, and then is again connected to the air supplying line; a transmission-side supercharging path part that is connected to the transmission-side air cleaner filter, passes through the electric supercharger, and then is connected to the transmission; and a controller that operates the dual-turbine electric supercharger according to a driving state of a vehicle and that individually controls the engine-side supercharging path part for boosting the engine and the transmission-side supercharging path part for cooling or warming the transmission through control of valves provided in the engine-side supercharging path part and the transmission-side supercharging path part.

The vehicle supercharging system according to another exemplary form of the present disclosure may further include an integrated cooler that cools air flowing through the air supplying line connected to the engine-side and the transmission-side supercharging path part connected to a transmission side.

According to the form of the present disclosure, by utilizing a dual-turbine electric supercharger of a vehicle to perform cooling control for acceleration through engine boosting and for preventing overheating of a friction clutch transmission, it is possible to improve drivability of the vehicle and durability of the transmission.

In addition, by providing a transmission cooling function in a driving situation that causes high temperature heat generation of a friction clutch and a transmission warming function in an extremely low temperature starting situation through one transmission supercharging path, it is possible to improve transmission clutch durability and vehicle quality.

Further, since it is possible to improve performance of a DCT, an MT, and an AMT, which have excellent transmission efficiency by being adapted to a variety of harsh driving environments, it may be expected to improve vehicle fuel efficiency by improving quality of transmissions using a launch friction material.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 8:
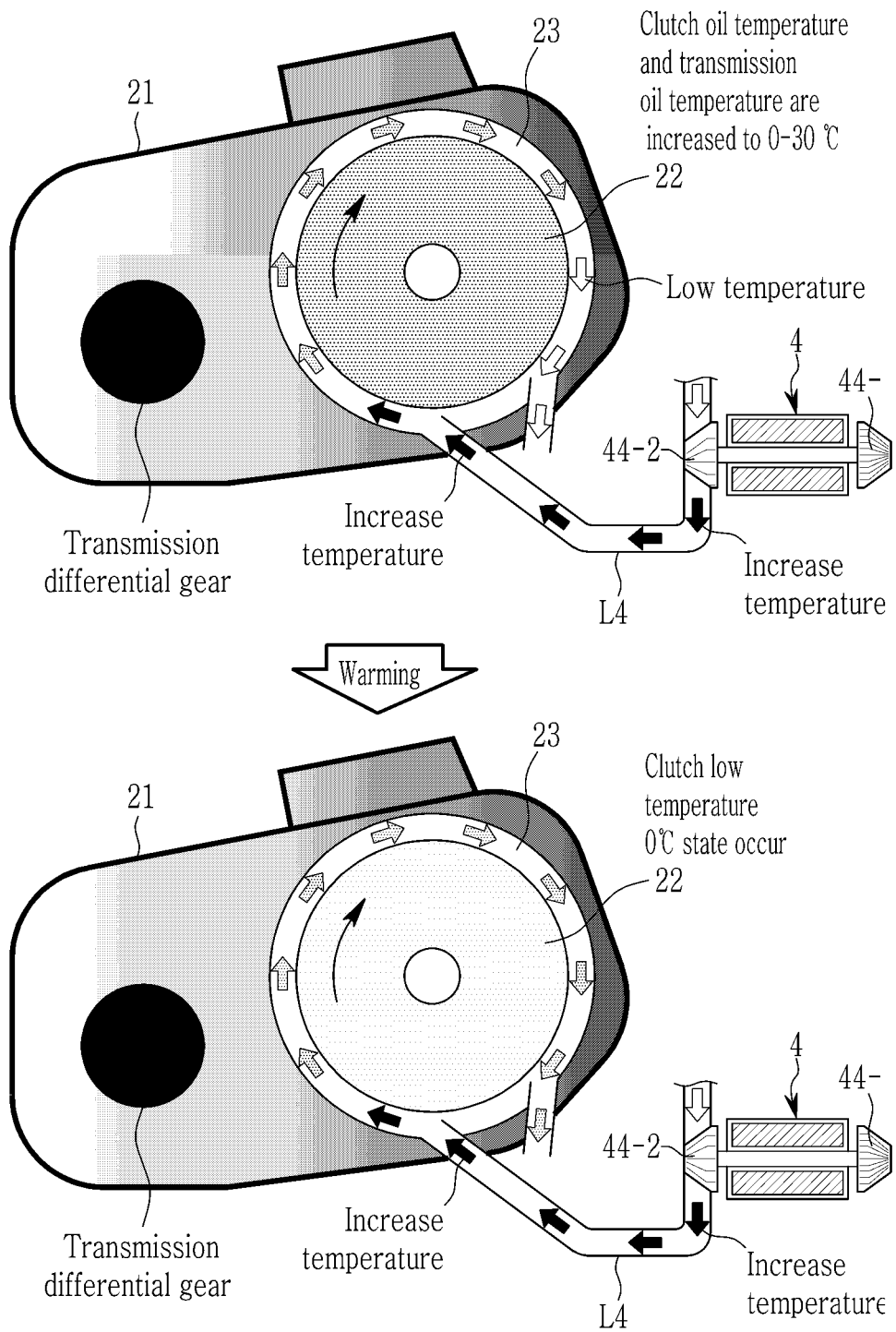
Figure 9:
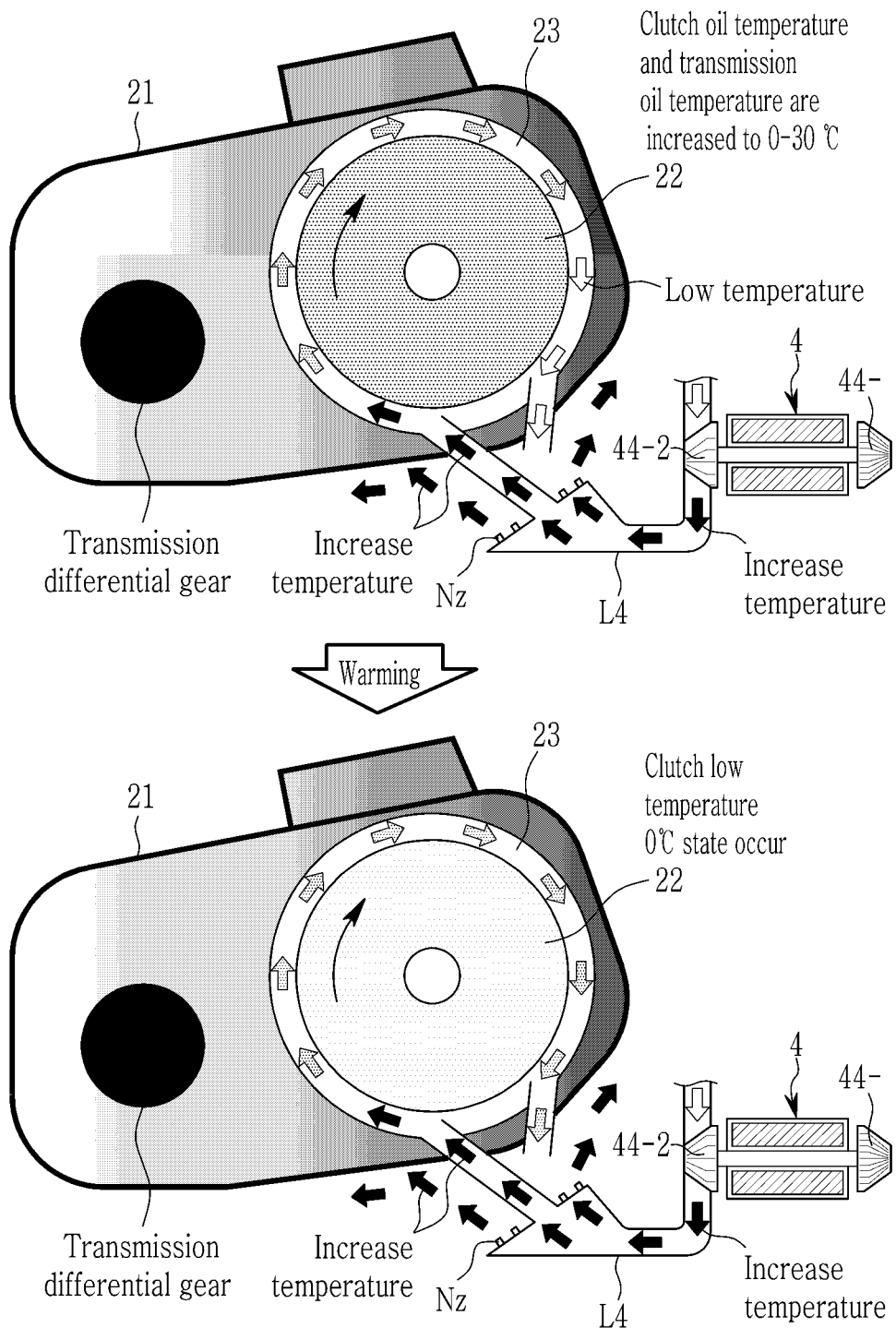
Figure 10:
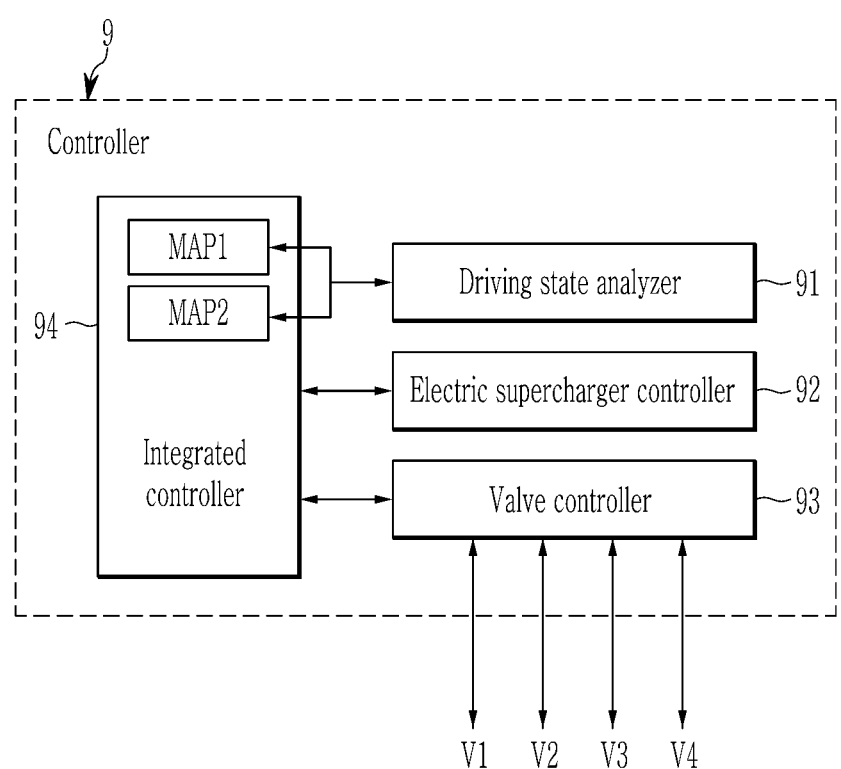
Figure 11:
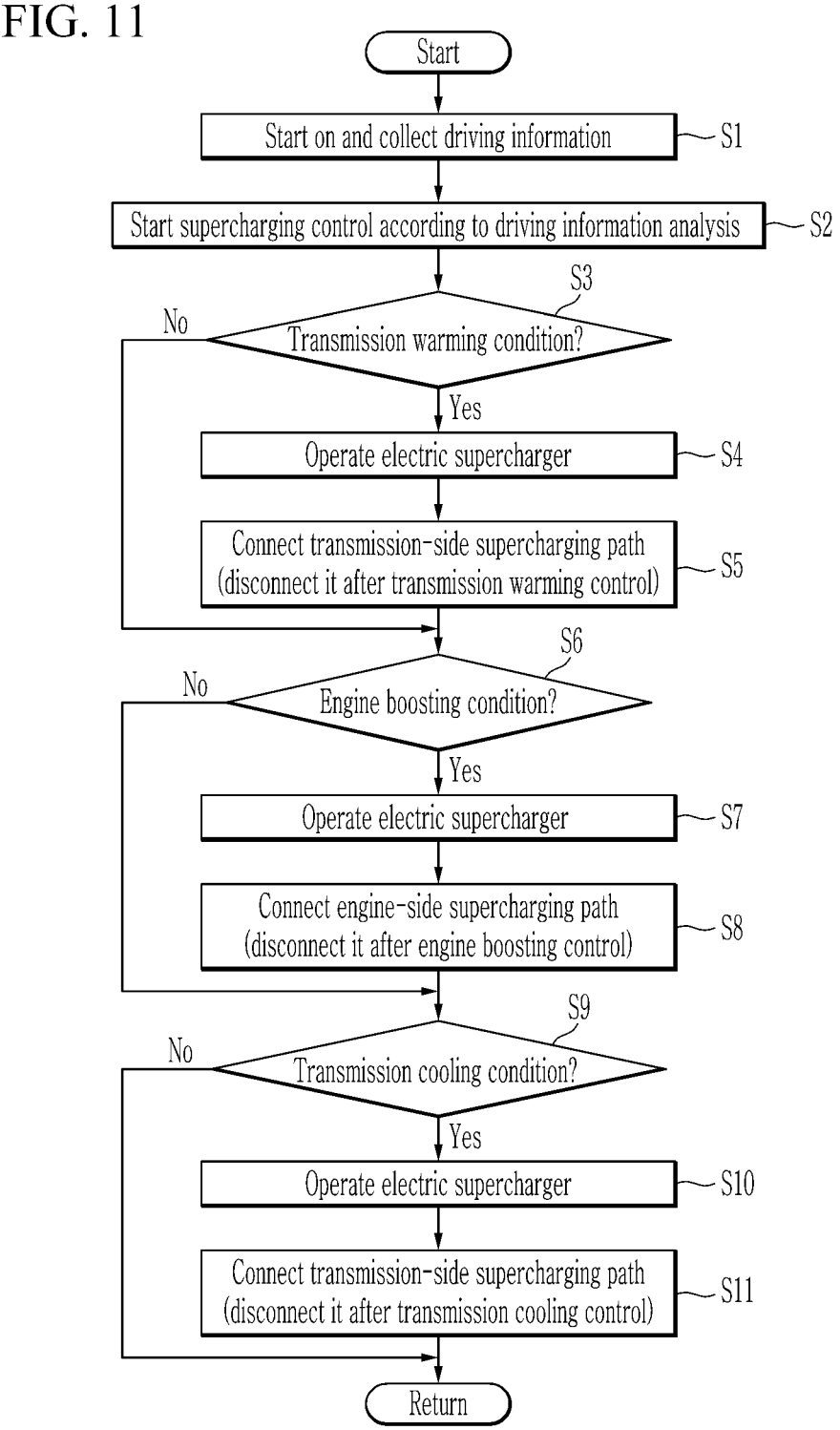
Figure 12:
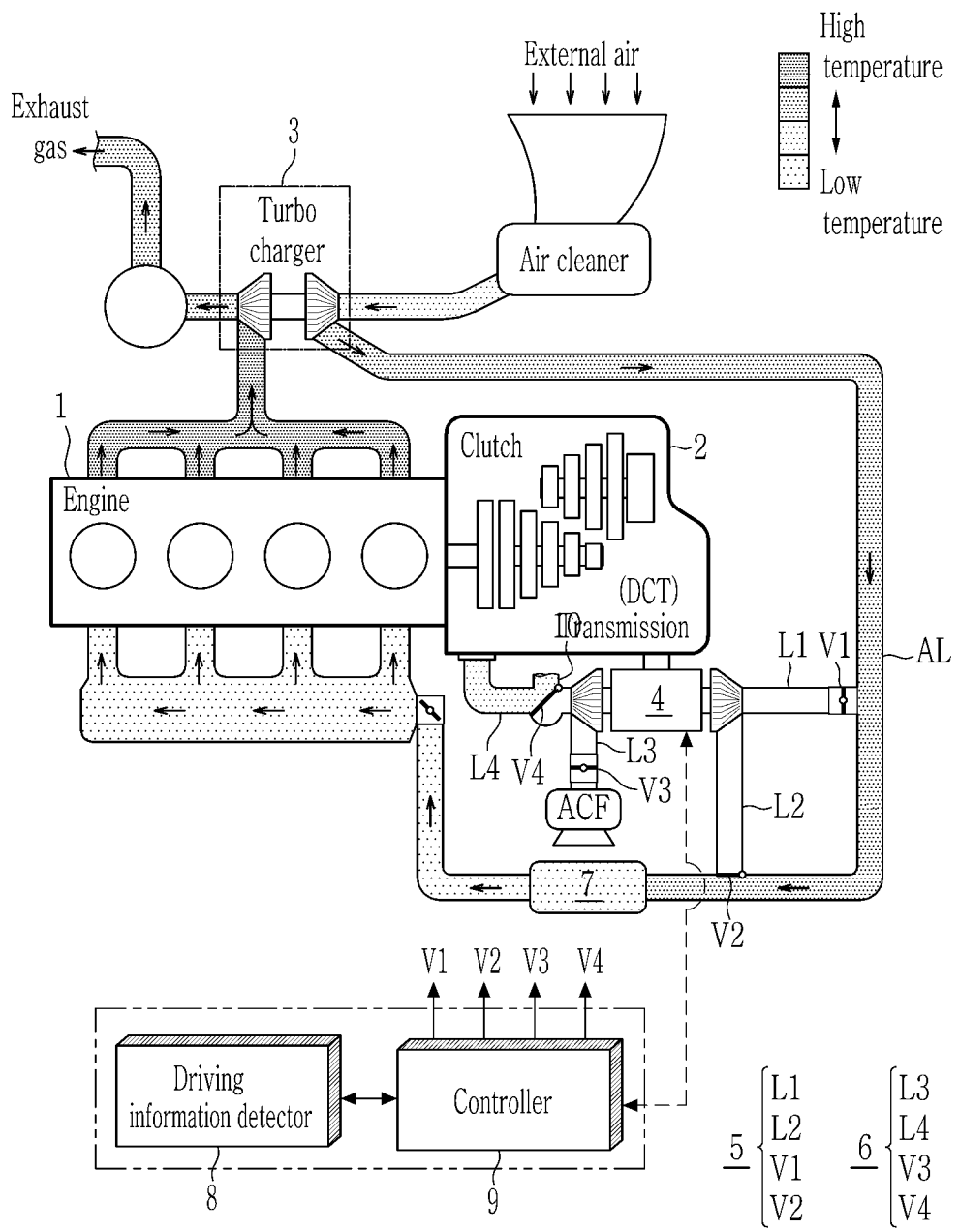
Figure 13:
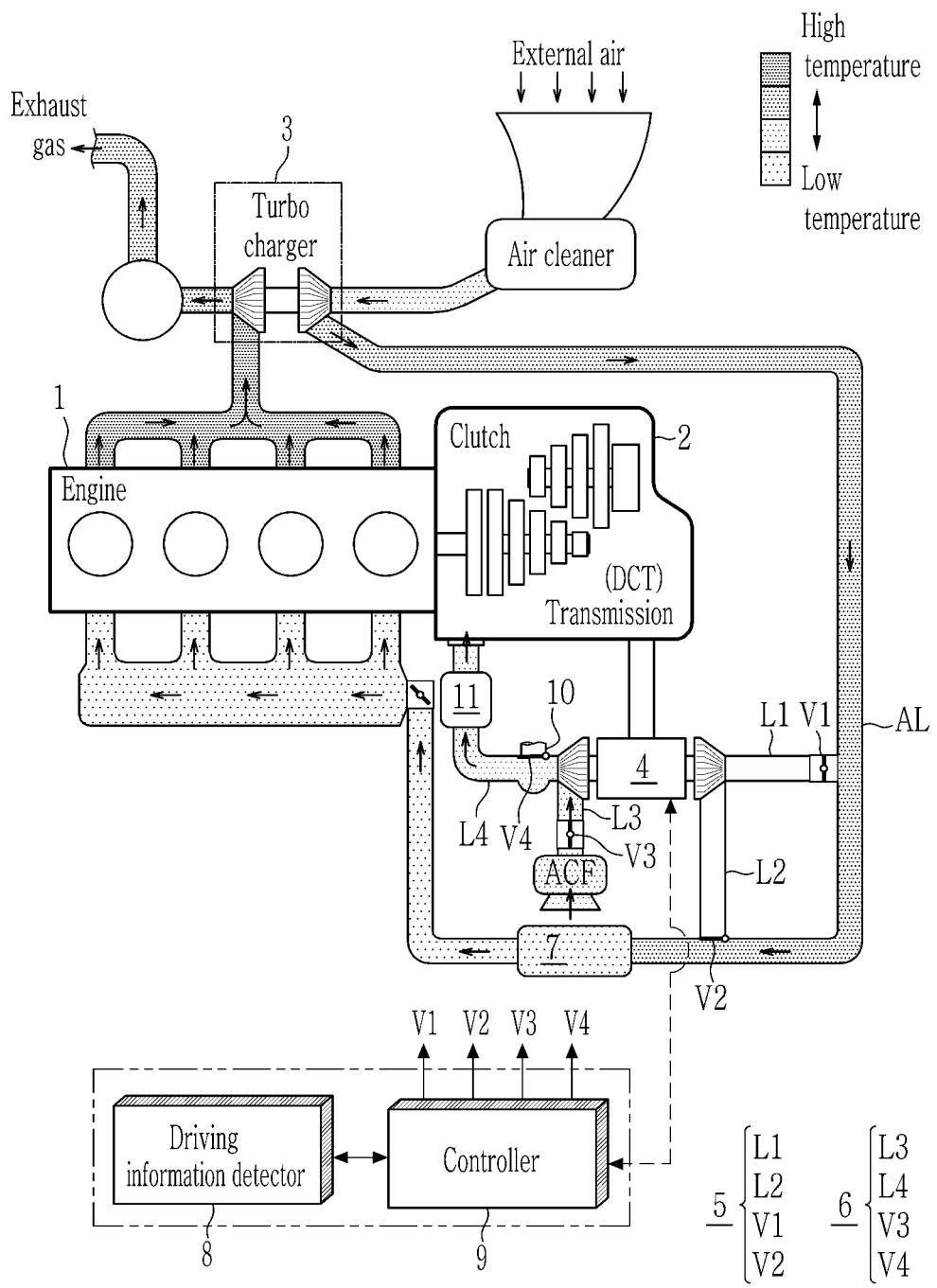
Figure 14:
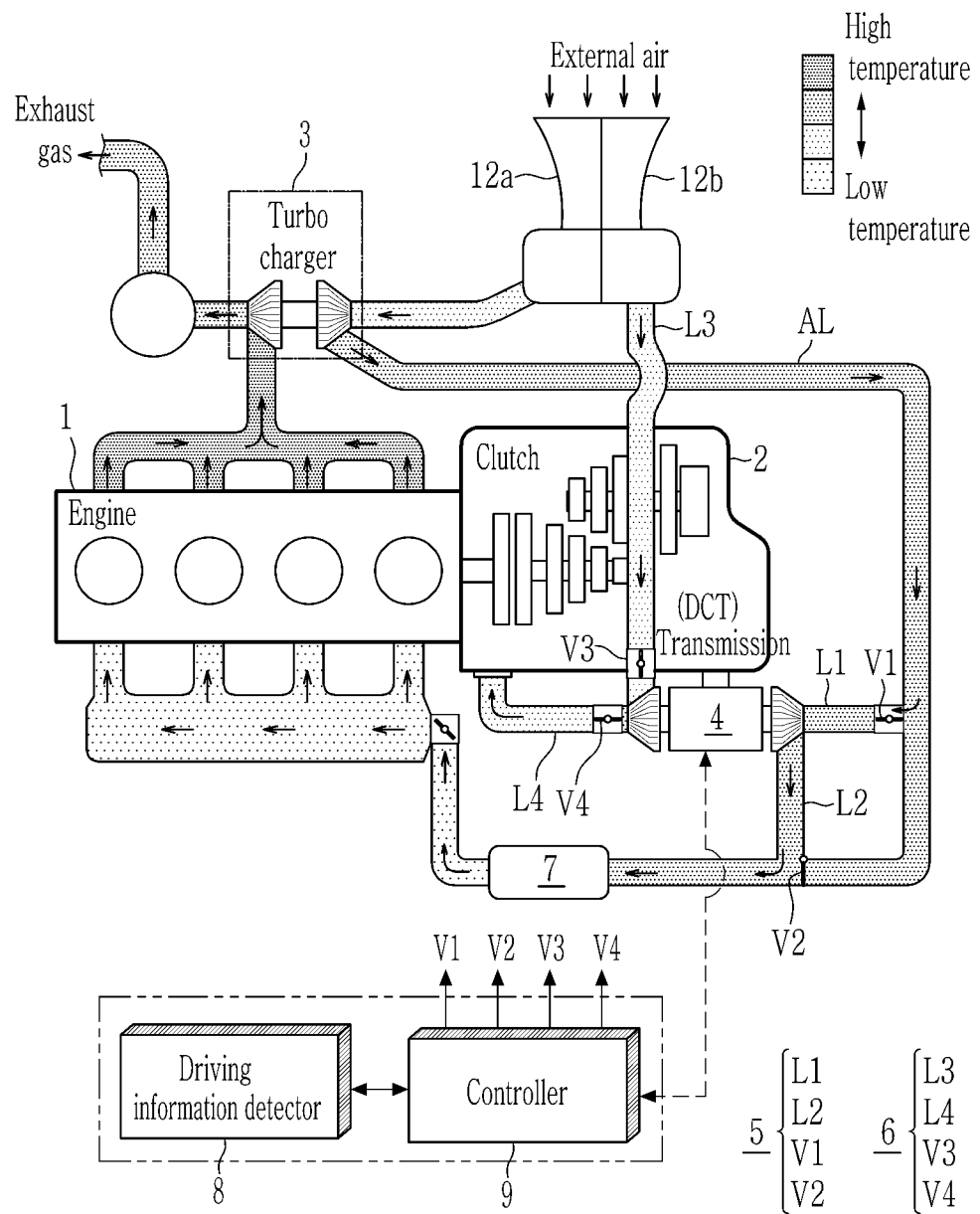
Figure 15:
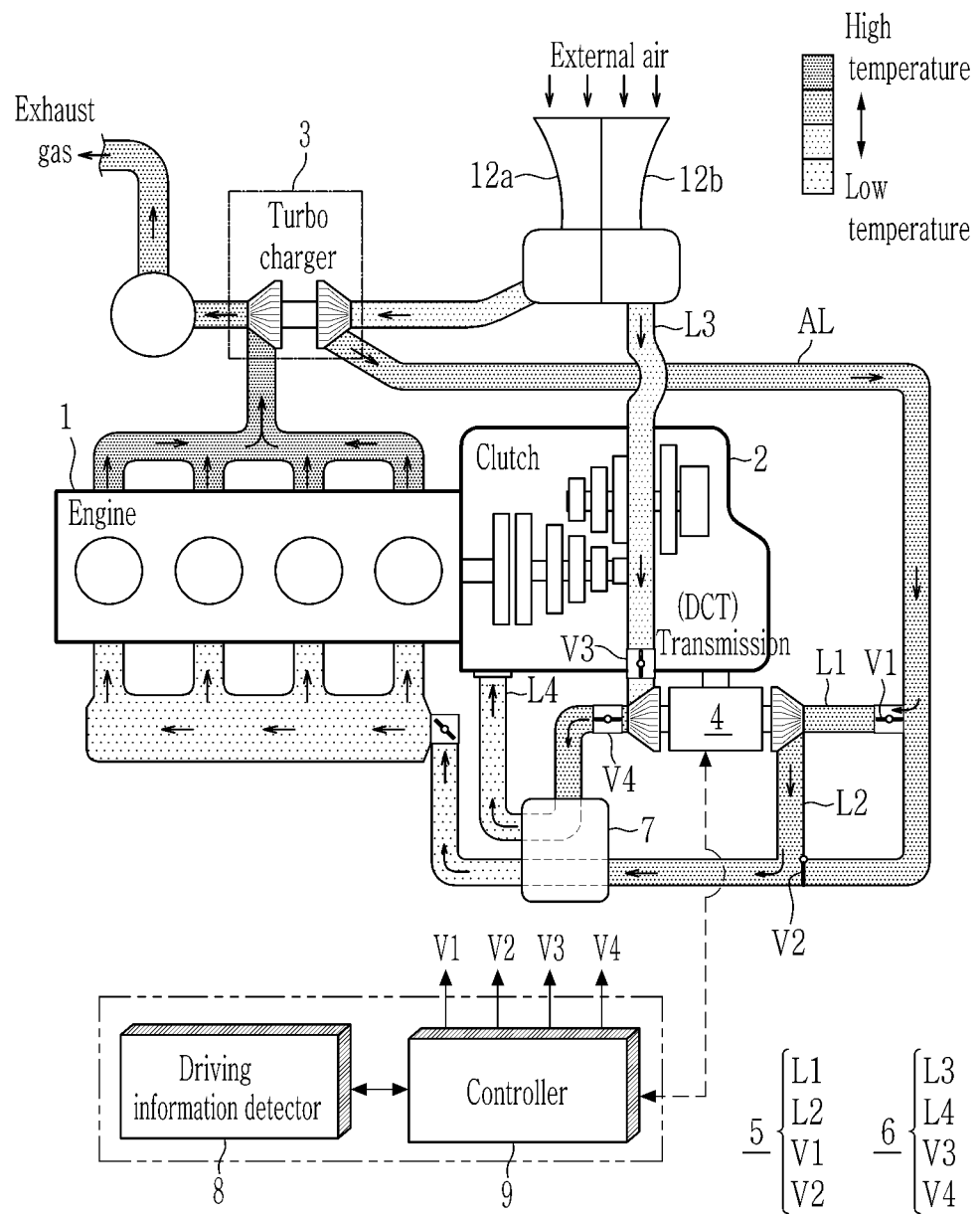
Figure 16:
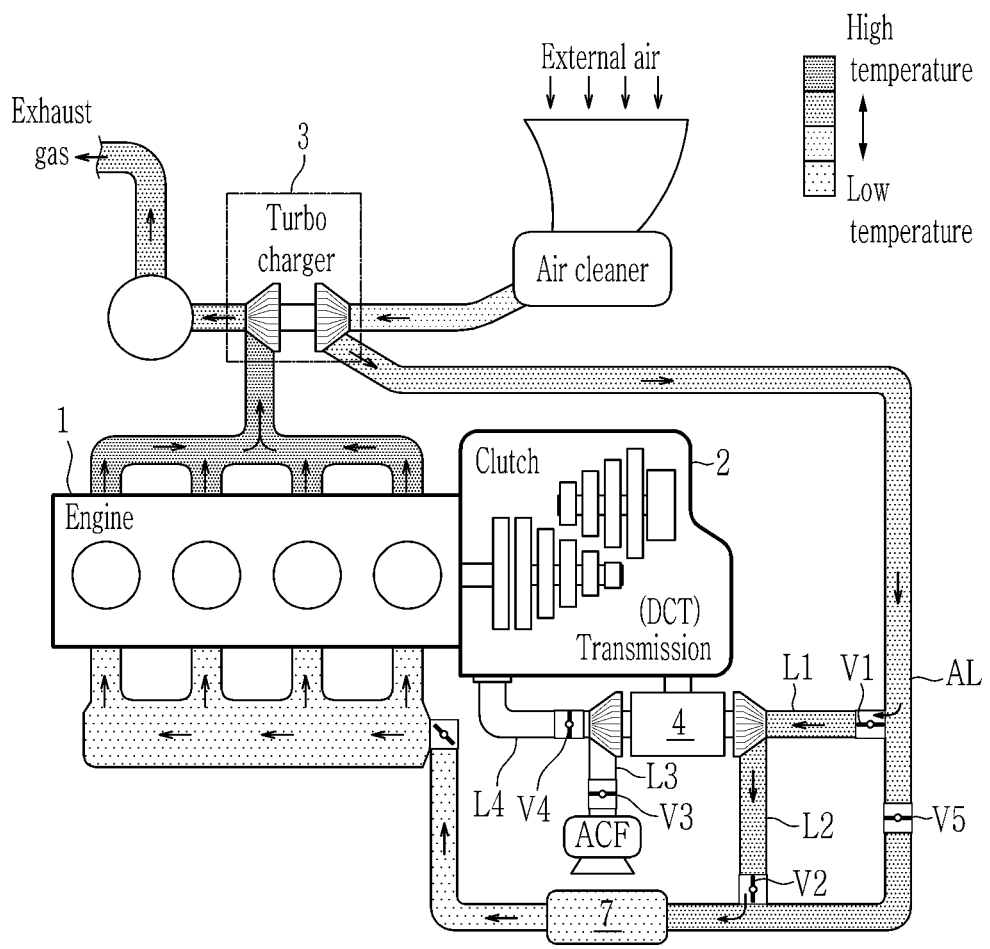
Figure 17:
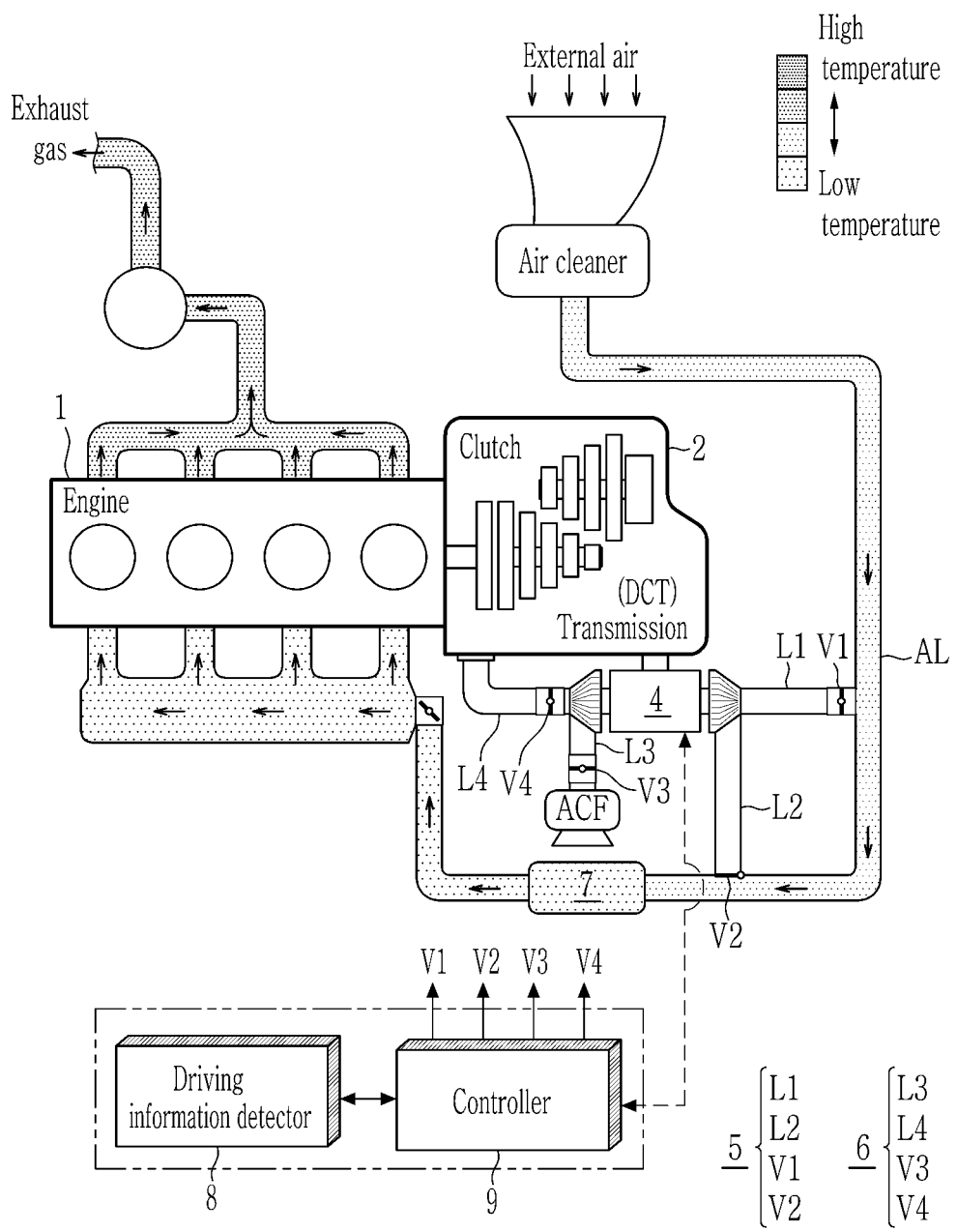

FIG. 8 and FIG. 9 respectively illustrate a warming structure inside a transmission housing in one form of the present disclosure;

FIG. 10 illustrates a block diagram of a detailed configuration of a controller in one form of the present disclosure;

FIG. 11 illustrates a flowchart of a supercharging control method for a vehicle in one form of the present disclosure;

FIG. 12 illustrates a schematic view of a vehicle supercharging system according to a first additional form of the present disclosure;

FIG. 13 illustrates a schematic view of a vehicle supercharging system according to a second additional form of the present disclosure;

FIG. 14 illustrates a schematic view of a vehicle supercharging system according to a third additional form of the present disclosure;

FIG. 15 illustrates a schematic view of a vehicle supercharging system according to a fourth additional form of the present disclosure;

FIG. 16 illustrates a schematic view of a vehicle supercharging system according to a fifth additional form of the present disclosure; and FIG. 17 illustrates a schematic view of a vehicle supercharging system according to a sixth additional form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In the following detailed description, only certain exemplary forms of the present disclosure have been shown and described, simply by way of illustration. As those skilled in the art would realize, the described forms may be modified in various different ways, all without departing from the spirit or scope of the present disclosure. Accordingly, the drawings and description are to be regarded as illustrative in nature and not restrictive.

In the present specification, unless explicitly described to the contrary, the word "comprise" and variations such as "comprises" or "comprising" will be understood to imply the inclusion of stated elements but not the exclusion of any other elements. In addition, the terms "-er", "-or", and "module" described in the specification means units for processing at least one function and operation, and can be implemented by hardware components or software components, and combinations thereof.

Throughout the specification, terms such as first, second, CA', CB', and the like will be used only to describe various elements, and are not to be interpreted as limiting these elements. The terms are used only to distinguish one element from another. For example, a first element may be referred as a second element while not going beyond the scope of the rights of the present disclosure, and in a similar manner, the second element may be referred to as a first element.

Throughout the specification, it should be understood that, when it is described that an element is "coupled" or "connected" to another element, the element may be "directly coupled" or "directly connected" to the another element or "coupled" or "connected" to the other element through a third element. In contrast, it should be understood that, when it is described that an element is "directly coupled" or "directly connected" to another element, no element is present between the element and the other element.

Hereinafter, a vehicle supercharging system and a control method thereof according to an form of the present disclosure will be described in detail with reference to the drawings.

Figure 1:
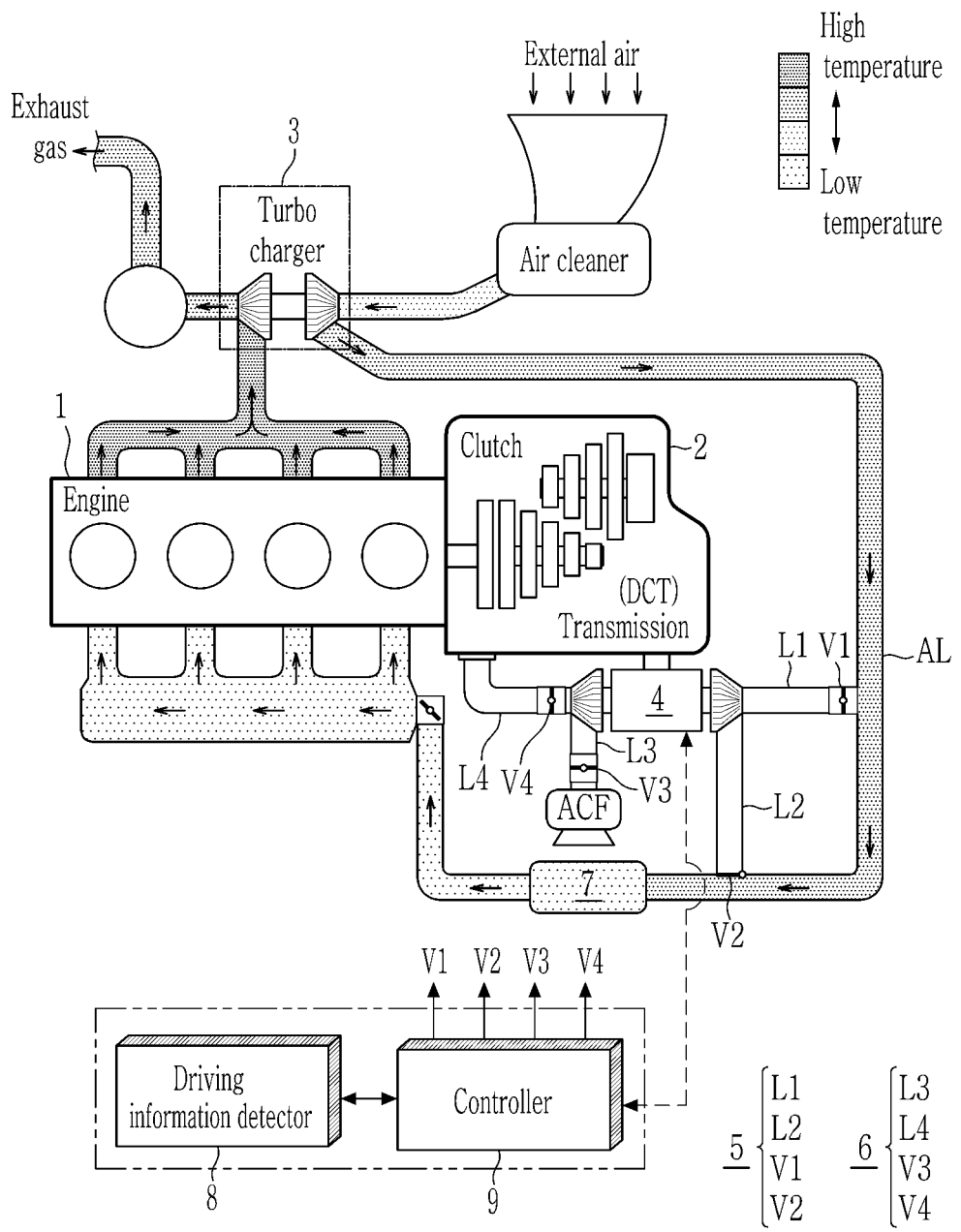
FIG. 1 illustrates a schematic view of a vehicle supercharging system in one form of the present disclosure.

FIG. 1 illustrates a schematic view of a vehicle supercharging system according to one form of the present disclosure.

Referring to FIG. 1, a vehicle transmission control system according to one form of the present disclosure includes an engine 1, a transmission 2, a turbocharger 3, a dual-turbine electric supercharger 4, an engine-side supercharging path part 5, a transmission-side supercharging path part 6, a cooler 7, a driving information detector 8, and a controller 9.

The engine 1 generates power desired to drive a vehicle as a fuel burns. For example, the engine 1 may be a gasoline or diesel engine, and it is controlled at an optimum operating point based on torque desired by a driver.

The transmission 2 is a transmission to which at least one friction clutch is applied, and for example, it may include an automatic transmission such as a dual clutch transmission (DCT) and an automatic manual transmission (AMT), and a manual transmission (MT).

The turbocharger 3 is an exhaust turbine driving type of supercharger that compresses external air and supplies it through an air supplying line AL to increase output of the engine 1.

The turbocharger 3 rotates a turbine by exhaust force of an exhaust gas discharged from the engine 1, compresses air flowing through an air cleaner through a compressor installed on the same rotating shaft, and supplies the compressed air to the air supplying line AL.

The air supplying line AL connects the compressor of the turbocharger 3 and the engine 1, and air for combustion of fuel flows therein. In FIG. 1, flow of the air that is supplied to the engine 1 through the air supplying line AL in a driving state of a typical vehicle is indicated by an arrow.

Since the turbocharger 3 utilizes the above-mentioned exhaust force, sufficient supercharging performance is realized at a high speed with a relatively high rotational speed of the engine 1. However, since the exhaust force is relatively low at a low speed, it is impossible to instantaneously increase the rotational speed of the turbine, resulting in a turbo lag, and thus, the supercharging performance of the turbocharger 3 is lowered.

The dual-turbine electric supercharger 4 is used to compensate for the limitation of the turbocharger 3, and compresses air by using rotational force of a motor. The dual-turbine electric supercharger 4 consists of a one-motor-two-turbine type in which turbines for supercharging the engine and the transmission are respectively installed on both sides of one motor. Here, the dual-turbine electric supercharger 4 may increase an air amount and density by secondarily recompressing the air primarily compressed in the turbocharger 3. That is, the dual-turbine electric supercharger 4 further compresses the air that is compressed by the turbocharger 3.

The dual-turbine electric supercharger 4 may operate in a desired operating condition regardless of the rotational speed of the engine 1 to supply sufficient air for boosting the engine and cooling the transmission.

Figure 2:
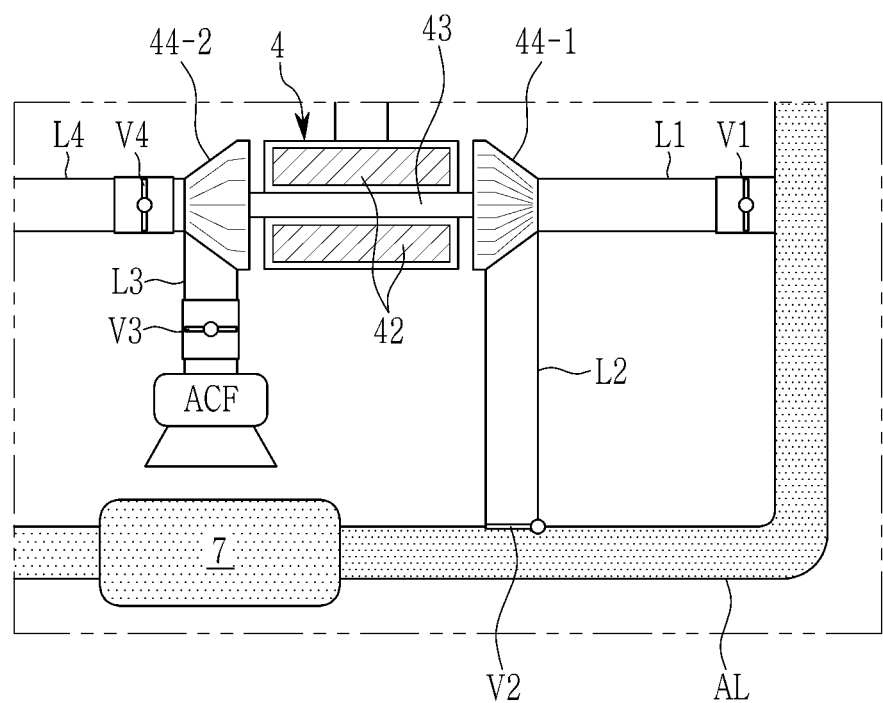
FIG. 2 illustrates a schematic view of a connection structure between an electric supercharger and surroundings thereof in one form of the present disclosure.

FIG. 2 illustrates a schematic view of a connection structure between an dual-turbine electric supercharger and surroundings thereof in one form of the present disclosure.

Referring to FIG. 2, the dual-turbine electric supercharger 4 according to the form of the present disclosure includes a stator 42 installed inside a housing 41, a rotor 43 that is rotated in accordance with an electrical signal applied to the stator 42, and turbines 44-1 and 44-2 mounted on a rotary shaft of the rotor 43.

The dual-turbine electric supercharger 4 may further include an inverter (not shown) that applies a signal by high speed switching through a semiconductor switching element to control rotational force of the turbines 44-1 and 44-2.

The dual-turbine electric supercharger 4 may be disposed adjacent to the transmission 2 away from the engine 1 because it is electrically operated and is susceptible to heat due to the nature of a control line CAN.

In addition, the dual-turbine electric supercharger 4 may be operated according to a driving state of the vehicle to compress the air flowing in the air supplying line (AL), and may then supply it through the engine-side supercharging path part 5 connected to the engine 1, or through the transmission-side supercharging path part 6 connected to the transmission 2.

The dual turbine include a first turbine 44-1 in which is installed in one end of the rotor 43 passing through the stator 42 and connected to the engine-side supercharging path part 5, and a second turbine 44-2 in which is installed in the other end of the rotor 43 and connected to the transmission-side supercharging path part 6.

The first turbine 44-1 and the second turbine 44-2 share the stator 42 and the rotor 43, and rotate with same speed according to an operation of the dual-turbine electric supercharger 4.

At this time, the first turbine 44-1 and the second turbine 44-2 may be configured with the same compression ratio, but the scope of the present disclosure is not limited thereto. For example, the compression ratio of the first turbine 44-1 for the engine side may greater than the compression ratio of the second turbine 44-2 for the transmission side. Because the transmission does not desire a relatively large compressed air compared to the engine, the compression ratio may be applied differentially by designing different wing shapes or number of wings of the first turbine 44-1 and the second turbine 44-2.

Through this, due to the characteristic of the dual-turbine electric supercharger 4 having two turbines, there is an advantage of reducing the load applied to the motor and the capacity of the motor. In addition, by applying a differential compression ratio of the turbines 44-1 and 44-2 of the dual-turbine electric supercharger 4, a large amount of compressed air may be supplied to the engine and the remaining compressed air may be supplied to the transmission. That is, compressed air is simultaneously supplied to the engine and the transmission.

The engine-side supercharging path part 5 branches off from the air supplying line AL that supplies air introduced from the outside to the engine 1, passes through the first turbine 44-1 of the dual-turbine electric supercharger 4, and then is connected to the air supplying line AL again.

The engine-side supercharging path part 5 serves to supply the air that is compressed by the dual-turbine electric supercharger 4 to the engine 1 under a boosting condition of the engine 1 determined based on the driving information of the vehicle.

To this end, the engine-side supercharging path part 5 includes a first bypass line L1, a first bypass valve V1, a second bypass line L2, and a second bypass valve V2, and thus, the engine-side supercharging path may be connected or disconnected.

In this case, the second bypass valve V2 may be configured as a three-way valve. When the second bypass valve V2 is opened, the air supplying line AL of upstream and downstream portions of the second bypass valve V2 may be blocked, and when the second bypass valve V2 is closed, the air supplying line AL of the upstream and downstream portions of the second bypass valve V2 may be fluidly communicated. That is, the air supplying line AL may be selectively fluidly communicated according to the opening and closing of the second bypass valve V2.

The first bypass line L1 branches off from the air supplying line AL, and is joined to an inlet of the first turbine 44-1 of the electric supercharger 4.

The first bypass valve V1 is installed at a position at which the air supplying line AL and the first bypass line L1 join, and it operates in an open or closed state according to a control signal applied thereto.

The second bypass line L2 connects an outlet of the first turbine 44-1 of the electric supercharger 4 to the air supplying line AL.

The second bypass valve V2 is installed at a position at which the air supplying line AL and the second bypass line L2 join, and it operates in an open or closed state according to a control signal applied thereto. The second bypass valve V2 may be configured as a three-way valve.

Figure 3:
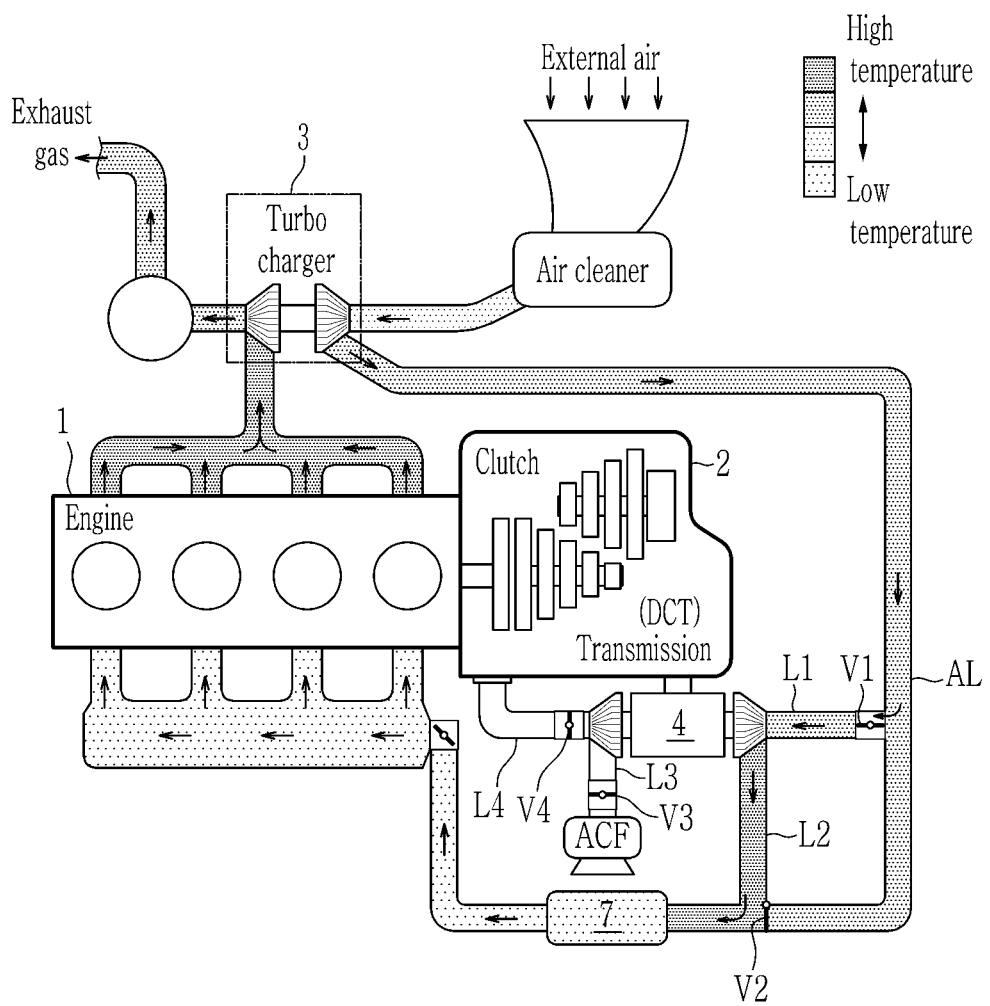
FIG. 3 illustrates a schematic view of an engine-side supercharging path during engine boosting in one form of the present disclosure.

FIG. 3 illustrates a schematic view of an engine-side supercharging path during engine boosting according to another form of the present disclosure.

Referring to FIG. 3, the engine-side supercharging path part 5 operates to open both the first bypass valve V1 and the second bypass valve V2 when the dual-turbine electric supercharger 4 operates under the engine boosting condition. In this case, both a first transmission-side air supplying valve V3 and a second transmission-side air supplying valve V4 corresponding to a transmission cooling condition (that is, irrelevant of the engine-side supercharging path) operate to be closed.

In the air flow of the engine-side supercharging path part 5, since the first bypass valve V1 operates to be opened and the second bypass valve V2 operates to be opened, the air that is compressed primarily in the turbocharger 3 flows in the first bypass line through the first bypass valve V1 from the air supplying line AL, and is further compressed by the dual-turbine electric supercharger 4. In addition, the air that is further compressed by the dual-turbine electric supercharger 4 flows in the air supplying line AL through the second bypass valve V2.

In this case, since the second bypass valve V2 is configured as a three-way valve, when the second bypass valve V2 operates to be opened, the air supplying line AL between the first bypass line and the second bypass line is blocked, so that it is possible to prevent backflow of the compressed air and to allow the compressed air to be supplied to the engine.

Figure 4:
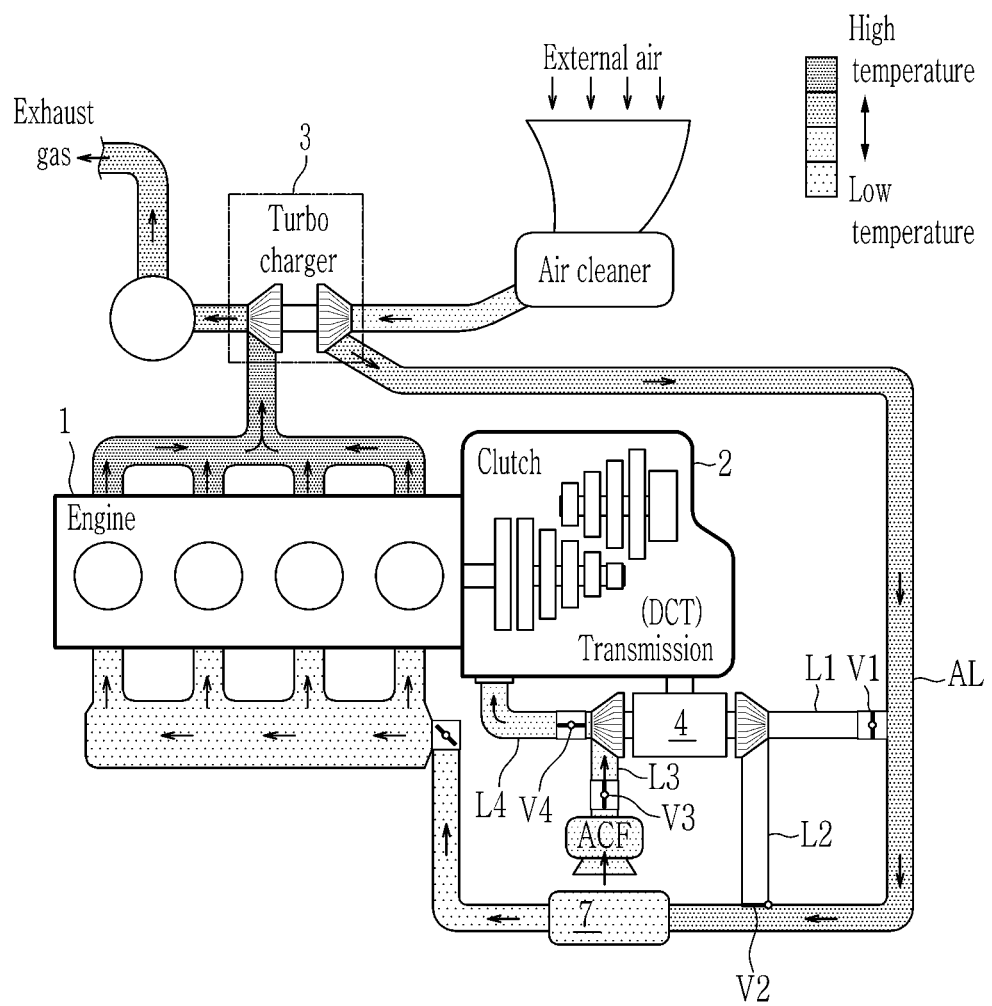
FIG. 4 illustrates a schematic view of a transmission-side supercharging path during transmission cooling/warming in one form of the present disclosure.

On the other hand, when it is not the engine boosting condition, both the first bypass valve V1 and the second bypass valve V2 of the engine-side supercharging path part 5 may operate to be closed (see FIG. 1 and FIG. 4).

Meanwhile, the transmission-side supercharging path part 6 is a transmission-side supply line that sucks air separately from the air supplying line AL that supplies the air introduced from the outside to the engine 1 and is connected to the transmission 2 after passing through the second turbine 44-2 of the electric supercharger 4.

The transmission-side supercharging path part 6 supplies the air that is compressed by the dual-turbine electric supercharger 4 to the transmission 2 under the transmission cooling condition that is determined based on the driving information of the vehicle.

To this end, the transmission-side supercharging path part 6 includes a first transmission-side supply line L3, a first transmission-side air supplying valve V3, a second transmission-side supply line L4, and a second transmission-side air supplying valve V4, and thus, the transmission-side supercharging path may be connected or disconnected.

The first transmission-side supply line L3 sucks external air separately from the engine-side supply line AL, and is connected to the inlet of the second turbine 44-2 of the electric supercharger 4. In this case, an air cleaner filter (ACF) for a transmission may be installed in the first transmission-side supply line L3 to purify impurities in the air flowing in the transmission side.

The first transmission-side air supplying valve V3 is installed at the first transmission-side supply line L3, and it operates in an open or closed state according to a control signal applied thereto.

The second transmission-side air supplying line L4 connects the outlet of the second turbine 44-2 to the inlet of the transmission 2.

The second transmission-side air supplying valve V4 is installed at the second transmission-side supply line L4, and it operates in an open or closed state according to a control signal applied thereto.

FIG. 4 illustrates a schematic view of a transmission-side supercharging path during transmission cooling/warming in some forms of the present disclosure.

Referring to FIG. 4, the transmission-side supercharging path part 6 operates to open both the first transmission-side air supplying valve V3 and the second transmission-side air supplying valve V4 when the dual-turbine electric supercharger 4 operates under the transmission cooling condition. In this case, both the first bypass valve V1 and the second bypass valve V2 corresponding to the engine boosting condition (that is, irrelevant of the transmission-side supercharging path) operate to be closed.

In the air flow of the transmission-side supercharging path part 6, since the first transmission-side air supplying valve V3 and the second transmission-side air supplying valve V4 operate to be opened and the electric supercharger 4 operates, the external air flowing through the transmission air cleaner filter (ACF) flows in the first transmission-side supply line L3, is compressed by the dual-turbine electric supercharger 4, and then supplied to the transmission 2 through the second transmission-side supply line L4.

On the other hand, the transmission-side supercharging path part 6 operates so that both the first transmission-side supply valve V3 and the second transmission-side supply valve V4 may be closed when it is not a transmission cooling condition (see FIG. 1 and FIG. 3).

In the above description, as shown in FIG. 4, criteria for determining the transmission cooling condition and the transmission warming condition are different depending on the driving state of the vehicle, but the path control of the transmission-side supercharging path part 6 and the air supply method for cooling and warming are the same.

Meanwhile, since the first turbine 44-1 and the second turbine 44-2 of the dual-turbine electric supercharger 4 are respectively connected to the engine side and the transmission side, compressed air is simultaneously supplied to the engine and the transmission.

Figure 5:
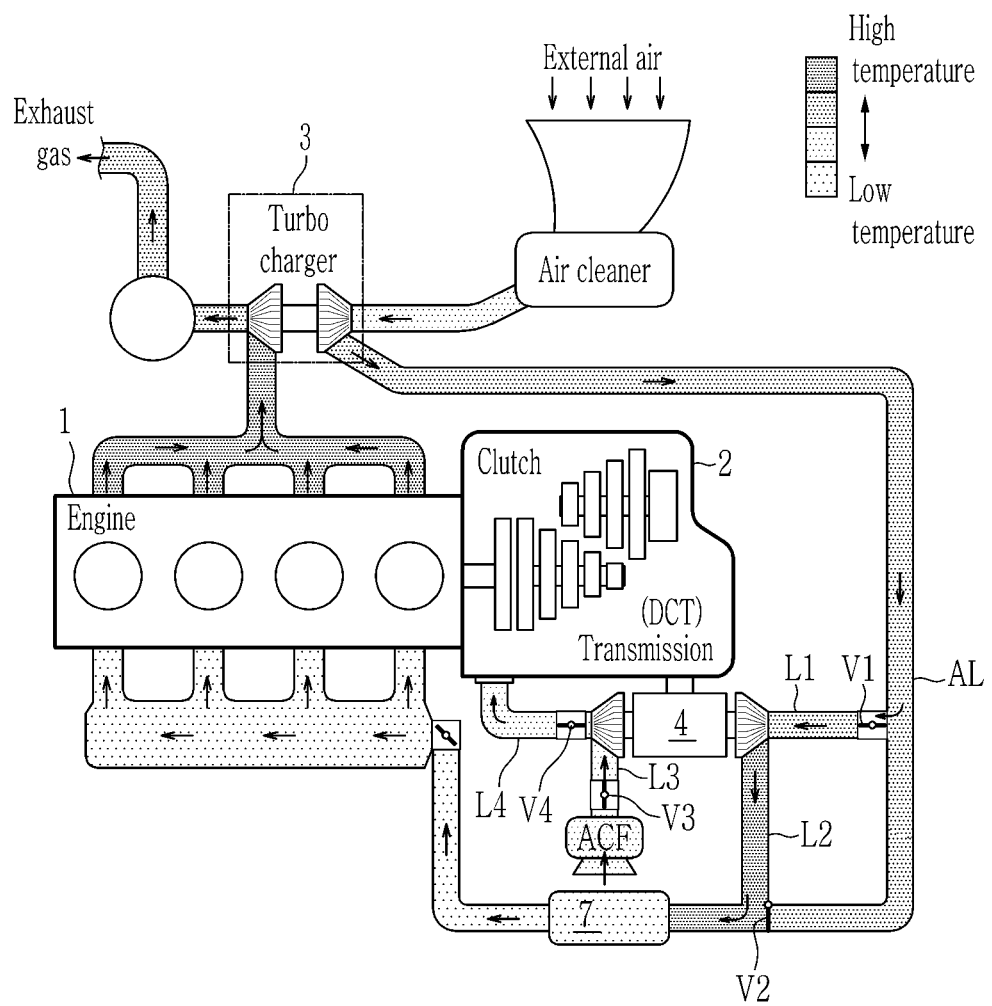
FIG. 5 illustrates an engine-side supercharging path and a transmission-side supercharging path according to an exemplary form of the present disclosure.

FIG. 5 illustrates an engine-side supercharging path and a transmission-side supercharging path according to an exemplary form of the present disclosure.

Referring to FIG. 5, when the engine boosting condition and the transmission cooling condition are satisfied, the dual-turbine electric supercharger 4 is operated, and the first bypass valve V1, the second bypass valve V2, the first transmission-side air supplying valve V3, and the second transmission-side air supplying valve V4 are opened.

Therefore, compressed air is simultaneously supplied to the engine and the transmission by the first turbine 44-1 and the second turbine 44-2 of the dual-turbine electric supercharger 4. At this time, since the compression ratio of the first turbine 44-1 is greater than the compression ratio of the second turbine 44-2, relatively large amount of compressed air is supplied to the engine.

Meanwhile, a cooling structure inside a transmission housing will be described below with reference to FIG. 6 and FIG. 7.

Figure 6:
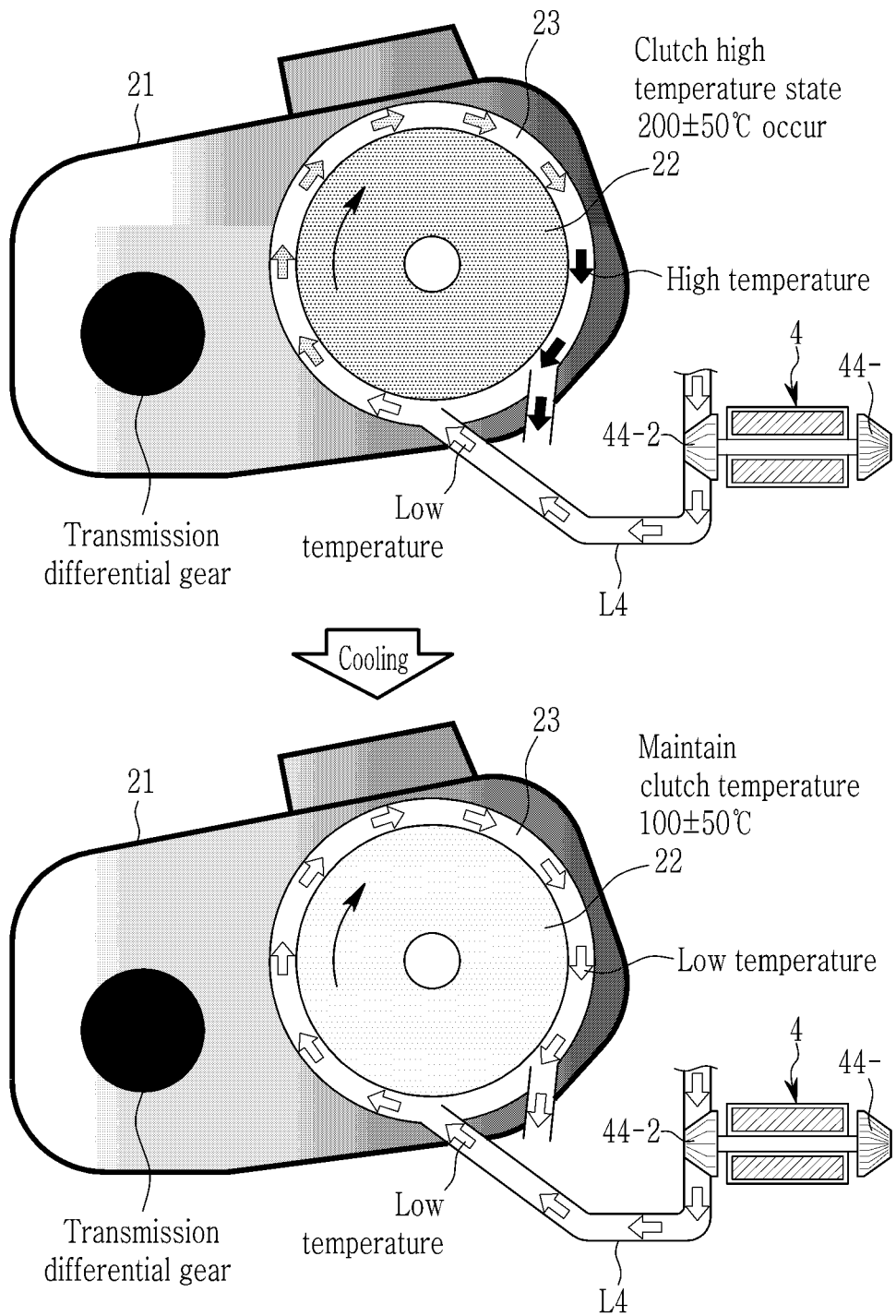
FIG. 6 illustrates a schematic view of a cooling structure inside a transmission housing in one form of the present disclosure.

FIG. 6 illustrates a schematic view of a cooling structure inside a transmission housing in some forms of the present disclosure.

Referring to FIG. 6, the transmission 2 is provided with an air circulating channel 23 that is formed in a circumferential direction around a clutch drum 22 inside a transmission housing 21, and a channel inlet thereof is fluidly communicated with the second transmission-side air supplying line L4 of the transmission side.

Air flows into the air circulating channel 23 from the second transmission-side air supplying line L4 according to the air flow in the transmission-side supercharging path formed by the control according to the transmission cooling condition. Air is heated while circulating around the hot clutch drum 22 and is discharged to the outside through an outlet of the air circulating channel 23, thereby cooling the clutch and the inside of the transmission.

Then, when a clutch temperature is maintained in a normal range by cooling by the air introduced through the transmission-side supercharging path, the controller stops an operation of the dual-turbine electric supercharger 4 and closes the related valves V3 and V4, thereby finishing the transmission cooling control.

Figure 7:
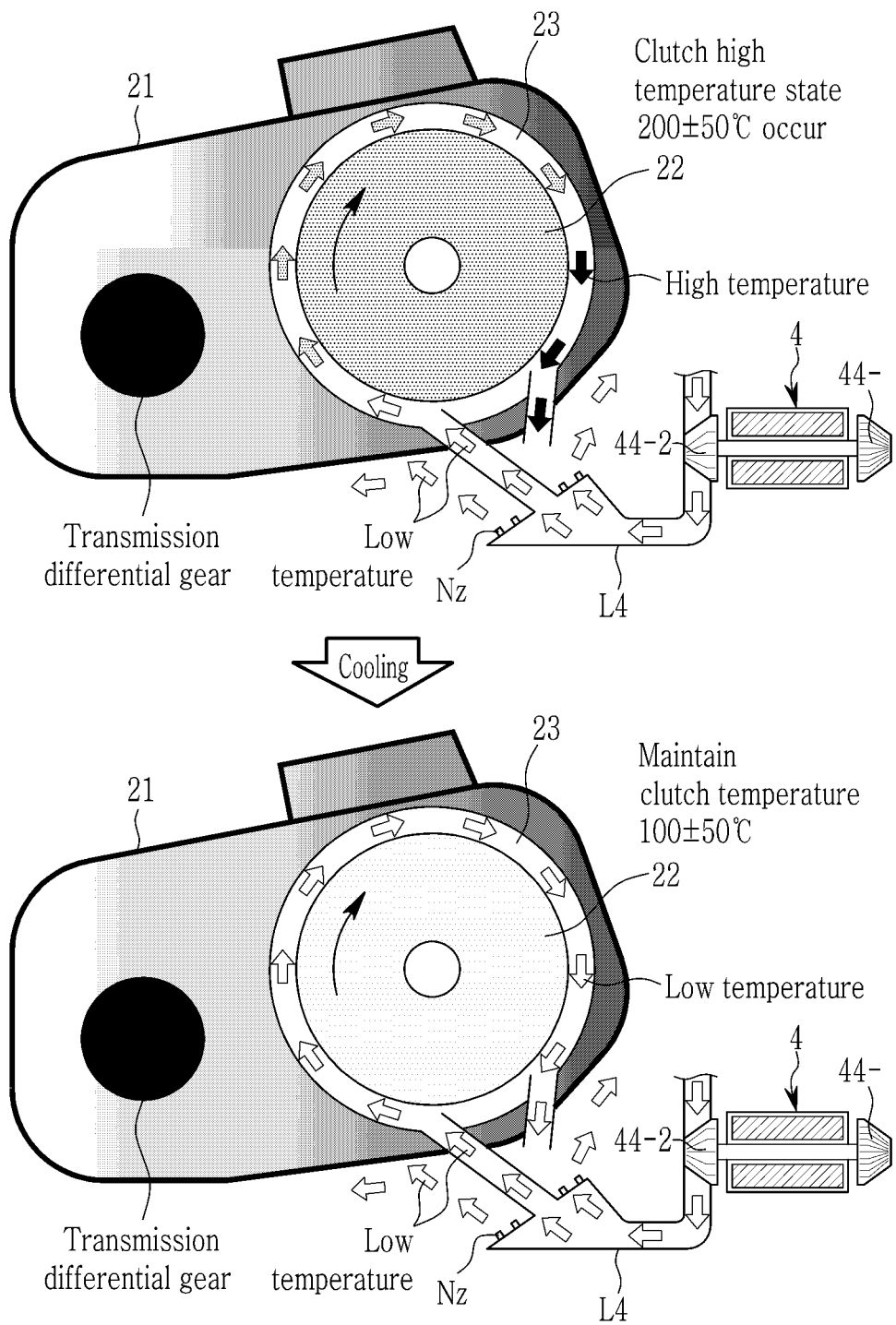
FIG. 7 illustrates a schematic view of a simultaneous cooling structure inside and outside a transmission housing according to another form of the present disclosure.

FIG. 7 illustrates a schematic view of a simultaneous cooling structure inside and outside a transmission housing according to another form of the present disclosure.

Referring to FIG. 7, the simultaneous cooling structure inside and outside a transmission housing is similar to that of FIG. 6, so redundant descriptions will be omitted and differences therebetween will be mainly described.

Here, at least one nozzle Nz (or hole) may be radially formed at an end portion of the second transmission-side air supplying line L4 connected to the inlet of the air circulating channel 23. A structure for ejecting air to the outside of the transmission housing 21 through the nozzle Nz (or hole) formed at the end portion of the second transmission-side air supplying line L4 may be provided.

Accordingly, some of the compressed air flowing into the second transmission-side supply line L4 according to the air flow of the transmission-side supercharging path may flow into the air circulating channel 23, and simultaneously, may be discharged to an outer surface of the transmission housing 21 through the radially formed nozzles Nz. Accordingly, it is possible to improve cooling performance by simultaneously cooling the inside and the outside of the transmission 2.

FIG. 8 and FIG. 9 respectively illustrate a warming structure inside a transmission housing in some forms of the present disclosure.

Referring to FIG. 8, an inner structure of the transmission 2 is the same as that of FIG. 5, and a discharging path of the warming air cooled by the inflow and circulation of the warming air through the air circulating channel 23 is also the same as that of FIG. 6.

However, in the warming of the transmission, there is a difference therebetween only in that the vehicle operates in an extremely low temperature environment or in a condition in which a clutch oil temperature during cold starting is a predetermined temperature or less. Due to this difference, the air flowing into the air circulating channel 23 of the transmission 2 is heated up through a compression process by the electric supercharger 4 to be warming air having a relatively high temperature compared with the external air.

The warming air is blown into the transmission to circulate therein, thereby increasing the temperature of the clutch and the transmission.

Next, referring to FIG. 9, as in FIG. 8, air heated through the compression process of the dual-turbine electric supercharger 4 may be introduced into the air circulating channel 23, and simultaneously, may be discharged to the outer surface of the transmission housing 21 through the radially arranged nozzles Nz.

Accordingly, it is possible to improve warming performance by simultaneously heating the inside and the outside of the transmission 2.

Referring back to FIG. 1, the cooler 7 is installed in the engine-side air supplying line AL to cool the air that is compressed and heated by at least one of the turbocharger 3 and the electric supercharger 4.

The cooler 7 is a cooling system installed separately from an engine cooler (not shown), and it may be configured as an air cooling type or a water cooling type.

The driving information detector 8 detects driving information desired for controlling the vehicle supercharging system in some forms of the present disclosure from various sensors according to the driving of the driver, and then transmits the driving information to the controller 9.

For example, the driving information detector 8 may detect driving information such as a signal of an accelerator pedal sensor (APS) according to an operation displacement of an accelerator pedal, a signal of a brake pedal sensor (BPS) according to an operation displacement of a brake pedal, a vehicle speed, an engine torque (Nm), and a road slope, transmission state information, a turbocharger operation state (ON/OFF), an electric supercharger operation state (ON/OFF), a transmission temperature (an oil temperature), an external temperature, and each valve state (open/closed).

In addition, when an autonomous driving system or an advanced driver assistance system is applied to the vehicle, the driving information detector 8 may detect driving information for autonomous driving collected from a front camera sensor, a radar sensor, a laser sensor, or the like.

The controller 9 is a computing device for controlling an overall operation of the vehicle supercharging system in some forms of the present disclosure, and it includes various programs therefor, data, and at least one processor for controlling the respective elements.

The controller 9 operates the dual-turbine electric supercharger 4 according to the driving state of the vehicle to control respective valves V1 to V4 to form the supercharging path for boosting the engine and the supercharging path for improving the cooling or warming performance of the transmission 2 to which the friction clutch is applied.

The controller 9 analyzes the driving state of the vehicle based on the driving information collected by the driving information detector 8, and operates the dual-turbine electric supercharger 4 when the engine boosting control condition or the transmission cooling/warming control condition is satisfied.

The controller 9 may control the bypass valves V1 to V4 so that the engine-side supercharging path part 5 and the transmission-side supercharging path part 6 are formed.

Specifically, when the engine boosting control condition is satisfied, the controller 9 may operate the dual-turbine electric supercharger 4, and simultaneously, it may form a bypass path of the engine-side supercharging path part 5 for the engine boosting.

In addition, when the transmission cooling/warming control condition is satisfied, the controller 9 may operate the dual-turbine electric supercharger 4, and simultaneously, it may form the transmission-side supercharging path part 6 for the transmission cooling/warming.

Further, when all of the engine boosting control condition and the transmission cooling/warming control condition are satisfied, the controller 9 may operate the dual-turbine electric supercharger 4, and simultaneously, it may form the engine-side supercharging path part 5 and the transmission-side supercharging path part 6.

FIG. 10 illustrates a block diagram of a detailed configuration of a controller in some forms of the present disclosure.

Referring to FIG. 10, the controller 9 in some forms of the present disclosure includes a driving state analyzer 91, an electric supercharger controller 92, a valve controller 93, and an integrated controller 94.

The driving state analyzer 91 analyzes the driving state of the vehicle based on the driving information collected by the driving information detector 8, and determines whether the engine boosting control condition or the transmission cooling/warming control condition is satisfied.

The driving state analyzer 91 analyzes an increasing rate of the APS operation signal according to the driver's accelerator pedal operation, and then, when a launch condition in which the increasing rate of the APS operation signal exceeds a predetermined threshold or an re-acceleration condition during driving is satisfied, it may be determined that the engine boosting control condition is satisfied.

In addition, the driving state analyzer 91, when the vehicle repeatedly goes and stops in a driving state of a low speed of a predetermined speed or less (for example, 20 kph or less) such that the operation signals of the accelerator pedal and the brake pedal are repeated for a predetermined time, or such that the transmission temperature is overheated to exceed the threshold temperature, determines that the transmission cooling control condition is satisfied. Here, the transmission temperature may be detected through the clutch oil temperature or the transmission oil temperature.

In addition, when an external air temperature is an extremely low temperature that is less than a predetermined temperature at start-on of the vehicle, or when the transmission temperature at cold start of the vehicle is less than the low temperature threshold, the driving state analyzer 91 may determine that the transmission warming control condition is satisfied.

To this end, the driving state analyzer 91 may store a control map MAP for determination for each of conditions derived through various tests, and may determine control and release points by using the control map MAP.

The electric supercharger controller 92 starts an operation of the dual-turbine electric supercharger 4 when a control signal satisfying one of the engine boosting control condition, the transmission cooling control condition, and the transmission warming control condition is received from the driving state analyzer 91.

In addition, the electric supercharger controller 92 terminates the operation of the dual-turbine electric supercharger 4 when a release signal is received from the driving state analyzer 91 during the operation of the dual-turbine electric supercharger 4.

The valve controller 93 controls respective valves V1 to V4 for setting the engine-side supercharging path or the transmission-side supercharging path in synchronization with a start point of the operation of the dual-turbine electric supercharger 4.

Compressed air may be supplied through the engine-side supercharging path part 5 connected to the engine 1, or compressed air may be supplied through the transmission-side supercharging path part 6 connected to the transmission 2.

That is, according to an operation command of a superordinate controller, the dual-turbine electric supercharger 4 operates in common to the above three control conditions, and the supercharging path control for the engine boosting control condition, the transmission cooling control condition, and the transmission warming control condition may be performed by the valve controller 93.

The integrated controller 94 is a host controller that controls the overall operation of the supercharging control system of the vehicle in some forms of the present disclosure.

When the engine boosting control condition or the transmission cooling/warming control condition according to the driving state of the vehicle analyzed by the driving state analyzer 91 is satisfied, the integrated controller 94 may apply a control signal corresponding thereto to the subordinate electric supercharger controller 92 and the valve controller 93 to control their operations.

This may be described in detail through a vehicle transmission control method described later.

Hereinafter, a supercharging control method for the vehicle in some forms of the present disclosure based on the configuration of the above-described vehicle supercharging system will be described in more detail below with reference to the drawings.

However, in the above description, the controllers of FIG. 10 are classified and described according to their respective functions, but the present disclosure is not limited thereto, and each of the controllers may be further subdivided by functions or integrated into one controller 9. Therefore, in the following description of the supercharging control method of the vehicle, the subject will be described as the controller 9.

FIG. 11 illustrates a flowchart of a supercharging control method for a vehicle according to one form of the present disclosure.

Referring to FIG. 11, the controller 9 collects driving information detected by the driving information detector 8 when the vehicle is started (S1).

The controller 9 analyzes the collected driving information to determine whether the engine boosting control condition, and the transmission cooling and warming control conditions are satisfied according to the driving state of the vehicle, and the supercharging control is started according to the above conditions (the engine boosting control condition, and the transmission cooling and warming control conditions) (S2).

When the driving state of the vehicle satisfies the transmission warming control condition (S3), the controller 9 operates the dual-turbine electric supercharger 4 (S4), and simultaneously connects the transmission-side supercharging path of the transmission-side supercharging path part 6 for the transmission warming (S5). In this case, the first transmission-side supply valve V3 and the second transmission-side supply valve V4 of the transmission-side supercharging path part 6 are maintained in the opened state, and the first bypass valve V1 and the second bypass valve V2 of the engine-side supercharging path part 5 are maintained in the closed state (see FIG. 4).

Thereafter, after the controller 9 maintains the transmission warming control until the clutch oil temperature collected from the driving information satisfies a predetermined condition, it may stop the dual-turbine electric supercharger 4 and disconnect the transmission-side supercharging path (see FIG. 1).

On the other hand, when the driving state of the vehicle satisfies the engine boosting control condition (S6), the controller 9 operates the dual-turbine electric supercharger (S7) and connects the engine-side supercharging path part 5 for the engine boosting (S8). In this case, the first bypass valve V1 and the second bypass valve V2 of the engine-side supercharging path part 5 are maintained in the opened state, and the first transmission-side supply valve V3 and the second transmission-side supply valve V4 of the transmission-side supercharging path part 6 are maintained in the closed state (see FIG. 3).

Thereafter, the controller 9 may maintain the engine boosting control until the launch/acceleration condition of the vehicle is released and then stop the dual-turbine electric supercharger 4 and disconnect the engine-side supercharging path (see FIG. 1).

When the driving state of the vehicle satisfies the transmission cooling control condition (S9), the controller 9 operates the dual-turbine electric supercharger (S10), and simultaneously connects the transmission-side supercharging path part 6 for the transmission cooling (S11). In this case, the first transmission-side supply valve V3 and the second transmission-side supply valve V4 of the transmission-side supercharging path part 6 are maintained in the opened state, and the first bypass valve V1 and the second bypass valve V2 of the engine-side supercharging path part 5 are maintained in the closed state (see FIG. 4).

After the controller 9 maintains the transmission cooling control until the clutch oil temperature collected from the driving information satisfies a predetermined condition, it may stop the dual-turbine electric supercharger 4 and disconnect the transmission-side supercharging path (see FIG. 1).

Then, the controller 9 may return to step S1 and selectively connect a desired supercharging path according to the driving state of the vehicle until the vehicle stops driving.

On the other hand, at step S3, the controller 9 does not perform steps S4 and S5 when the driving state of the vehicle does not satisfy the transmission warming control condition (S3).

Similarly, when the driving state of the vehicle does not satisfy the engine boosting control condition (S6) or does not satisfy the transmission cooling control condition (S9), the controller 9 may not perform steps S7 and S8 or S10 and S11 respectively corresponding thereto.

Since the supercharging control method described with reference to FIG. 11 is one example assuming a driving scenario of a vehicle, an order for each control condition is not limited to the above, and is determined according to driving conditions.

In addition, when a situation in which the engine boosting control condition and the transmission cooling/warming control condition are simultaneously satisfied occurs, the controller 9 may simultaneously perform the transmission cooling/warming control and the engine boosting control is first performed.

As such, according to some forms of the present disclosure, by utilizing the dual-turbine electric supercharger to perform the cooling control for acceleration through the engine boosting and for preventing overheating of the friction clutch transmission, it is possible to improve driveability of the vehicle and durability of the transmission.

In addition, by providing the transmission cooling function in the driving situation that causes the high temperature heat generation of the friction clutch and the transmission warming function in the extremely low temperature starting situation through one transmission supercharging path, it is possible to improve transmission clutch durability and vehicle quality.

Further, it is possible to improve performance of a dual clutch transmission (DCT) having excellent transmission efficiency, a manual transmission (MT), and an automatic manual transmission (MTT), and to improve vehicle fuel efficiency by improving marketability of transmissions using a launch friction material.

Although some forms of the present disclosure have been described above, the present disclosure is not limited to the above-described forms, and various other modifications are possible.

For example, the vehicle supercharging system of the present disclosure is not limited to the above-described system configuration, and addition and modification as in various forms below are possible.

FIG. 12 illustrates a schematic view of a vehicle supercharging system according to a first additional form of the present disclosure.

Referring to FIG. 12, a basic configuration of a vehicle supercharging system according to a first additional form of the present disclosure is similar to that of the form of FIG. 1, except that a bypass hole 10 is formed in the second transmission-side air supplying line L4 of the transmission-side supercharging path part 6.

That is, when the second transmission-side supply valve V4 is opened, compressed air by the dual-turbine electric supercharger 4 may be supplied to the transmission 2 through the second transmission-side supply line L4.

Meanwhile, when the second transmission-side supply valve V4 is blocked while the electric supercharger 4 is not operating, the air inside the transmission may be discharged to the outside through the bypass hole 10. Here, the non-operational state of the electric supercharger 4 may mean a state in which the engine boosting condition and the transmission cooling/warming condition are excluded.

In addition, the second transmission-side air supplying valve V4 may be configured as a three-way valve so that the first transmission-side supply line L3 and the second transmission-side supply line L4 fluidly communicate, or the second transmission-side supply line L4 and the inlet of the second turbine 44-2 do not communicate by blocking the inlet of the second turbine 44-2.

FIG. 13 illustrates a schematic view of a vehicle supercharging system according to a second additional form of the present disclosure.

Referring to FIG. 13, a vehicle supercharging system according to a second additional form of the present disclosure is similar to that of the form of FIG. 12 described above, but there is a difference therebetween in that a transmission cooler 11 is added in the second transmission-side air supplying line L4 of the transmission-side supercharging path part 6.

The transmission cooler 11 is installed in the second transmission-side supply line L4 of the transmission side, and it may improve the cooling performance of the transmission by cooling air heated in a compression process of the dual-turbine electric supercharger 4 when controlling the transmission cooling.

FIG. 14 illustrates a schematic view of a vehicle supercharging system according to a third additional form of the present disclosure.

Referring to FIG. 14, the vehicle supercharging system according to the third additional form of the present disclosure is similar to that of the form of FIG. 1 described above, except that an air cleaner filter 12 is divided into an engine-side air cleaner filter 12a and a transmission-side air cleaner filter 12b.

In addition, the first transmission-side supply line L3 of the transmission-side supercharging path part 6 is characterized in that it is directly connected to the transmission-side air cleaner filter 12b instead of the existing air supplying line AL.

As such, the transmission-side supercharging path is directly connected to the transmission-side air cleaner filter 12b, and thus there is an advantage that the conventional separate transmission-side air cleaner filter (ACF) may be omitted.

In addition, air introduced into the engine-side air cleaner filter 12a passes through the turbocharger 3 and then is supplied to the engine 1 through the air supplying line AL, and air introduced into the transmission-side air cleaner filter 12b passes through the transmission-side supercharging path part 6 and the dual-turbnie electric supercharger 4 and then flows into the transmission 2.

Therefore, there is an advantage that the compressed air supplied to the engine 1 is not affected by directly transferring the air purified by the transmission-side air cleaner filter 12b to the dual-turbine electric supercharger 4 without bypassing the air supplying line AL during the transmission cooling/warming control.

FIG. 15 illustrates a schematic view of a vehicle supercharging system according to a fourth additional form of the present disclosure.

Referring to FIG. 15, the vehicle supercharging system according to the fourth additional form of the present disclosure is similar to that of the form of FIG. 14 described above, except that the integrated cooler 7 is shared between the engine-side line and the transmission-side line.

That is, since the air supplying line AL connected to the integrated cooler 7 at the engine-side and the second transmission-side supply line L4 connected thereto at the transmission side pass side by side, the configuration of the transmission cooler 11 of FIG. 13 may be omitted. In other words, the integrated cooler 7 is provided to integrally cool the air flowing through the air supplying line AL connected to the engine side and the second transmission-side supply line L4 connected to the transmission side, so that a separate transmission cooler may be omitted, thereby reducing manufacturing costs of the vehicle.

FIG. 16 illustrates a schematic view of a vehicle supercharging system according to a fifth additional form of the present disclosure.

Referring to FIG. 16, the vehicle supercharging system according to the fifth additional form of the present disclosure is similar to that of the form of FIG. 3, except that both the first bypass valve V1 and the second bypass valve V2 are respectively configured as a two-way valve and that a back-flow prevention valve V5 is provided on the air supplying line AL to which the first bypass line L2 and the second bypass line L2 are connected.

In air flow of the engine-side supercharging path part 5, the air flowing into the air supplying line AL from the turbocharger 3 is introduced into the first bypass line L1 by the opening of the first bypass valve V1 and compressed by the operation of the dual-turbine electric supercharger 4, and then it is discharged to the air supplying line AL through the second bypass line L2 and the second bypass valve V2. In this case, the back-flow prevention valve V5 may prevent back-flow of air and to supercharge the air to the engine-side by operating to be closed during the engine-side supercharging to block a passage of the air supplying line AL.

FIG. 17 illustrates a schematic view of a vehicle supercharging system according to a sixth additional form of the present disclosure.

Referring to FIG. 17, the vehicle supercharging system according to the sixth additional form of the present disclosure is similar to that of the form of FIG. 1 described above, except that turbocharger 3 is omitted.

According to the sixth additional form, even in an indirect injection engine without the turbocharger 3, a multi-point injection (MPI) engine, or the like, the engine boosting using the electric supercharger and the clutch cooling and warming of the automatic transmission provided with the launch friction clutch may be performed.

The above-described methods and apparatuses are not only realized by the form of the present disclosure, but, on the contrary, are intended to be realized by a program for realizing functions corresponding to the configuration of the form of the present disclosure or a recording medium for recording the program.

While this present disclosure has been described in connection with what is presently considered to be practical forms, it is to be understood that the present disclosure is not limited to the disclosed forms, but, on the contrary, is intended to cover various modifications and equivalent arrangements included within the spirit and scope of the present disclosure.

What is claimed is:

1. A vehicle supercharging system, comprising:
an engine;
a transmission;
a dual-turbine electric supercharger configured to compress air by rotational force of a motor and including a first turbine and a second turbine;
an engine-side supercharging path part branching off from an air supplying line configured to supply air to the engine, and configured to pass through the first turbine and join into the air supplying line;
a transmission-side supercharging path part configured to:
suck air separately from the air supplying line,
pass through the second turbine, and
supply the compressed air to the transmission; and
a controller configured to:
operate the dual-turbine electric supercharger based on a driving state of a vehicle, and
individually control the engine-side supercharging path part for boosting the engine and the transmission-side supercharging path part for cooling or warming the transmission by controlling valves provided in the engine-side supercharging path part and the transmission-side supercharging path part.

2. The vehicle supercharging system of claim 1, wherein the transmission is a dual clutch transmission (DCT), an automatic manual transmission (AMT), or a manual transmission (MT).

3. The vehicle supercharging system of claim 1, wherein:
the transmission is provided with an air circulating channel formed around a clutch drum inside a transmission housing in a circumferential direction, and
an inlet of the air circulating channel is connected to the transmission-side supercharging path part.

4. The vehicle supercharging system of claim 1, wherein the first turbine and the second turbine are configured to share a stator and a rotor in a housing, and rotate at a same speed.

5. The vehicle supercharging system of claim 1, wherein a compression ratio of the first turbine is greater than a compression ratio of the second turbine.

6. The vehicle supercharging system of claim 1, wherein the engine-side supercharging path part includes:
a first bypass line branching off from the air supplying line and joining into an inlet of the first turbine;
a first bypass valve installed at the first bypass line and operated in an open or closed state;

a second bypass line connecting an outlet of the second turbine and the air supplying line; and a second bypass valve installed in the second bypass line and operated in an open or closed state, wherein the second bypass valve is a two-way valve or a three-way valve, and when the second bypass valve is the two-way valve, a back-flow prevention valve configured to prevent a back-flow is installed in the air supplying line.

7. The vehicle supercharging system of claim 6, wherein the transmission-side supercharging path part includes:
a first transmission-side supply line configured to suck air separately from the air supplying line and connected to an inlet of the second turbine;
a first transmission-side air supplying valve installed at the first transmission-side supply line and configured to operate in an open or closed state;
a second transmission-side supply line connecting an outlet of the second turbine to an inlet of the transmission; and
a second transmission-side air supplying valve installed at the second transmission-side supply line configured to operate in an open or closed state.

8. The vehicle supercharging system of claim 7, wherein the first transmission-side supply line is provided with a transmission air cleaner configured to filter air flowing into the transmission.

9. The vehicle supercharging system of claim 7, wherein the second transmission-side supply line is provided with a bypass hole through which air in the transmission is discharged to an outside of the transmission when the second transmission-side air supplying valve V4 is blocked.

10. The vehicle supercharging system of claim 7, wherein the second transmission-side supply line is installed with a transmission cooler configured to cool air that is compressed and heated by the dual-turbine electric supercharger.

11. The vehicle supercharging system of claim 7, wherein the second transmission-side supply line configured to fluidly communicate with an air circulating channel formed inside the transmission housing, and
at least one nozzle configured to eject air to an outside of the transmission housing is provided at an end portion of the second transmission-side supply line.

12. The vehicle supercharging system of claim 1, further comprising:
a turbocharger configured to compress air introduced from an outside by exhaust force of the engine and supply the compressed air to the air supplying line;
a cooler installed in the air supplying line and configured to cool air heated by compression of at least one of the turbocharger or the dual-turbine electric supercharger; and
a driving information detector configured to collect various driving information desired for controlling a supercharging path of the vehicle from sensors while the vehicle is driving.

13. The vehicle supercharging system of claim 12, wherein
the dual-turbine electric supercharger further compresses air that is compressed by the turbocharger.

14. The vehicle supercharging system of claim 12, wherein the controller includes:
a driving state analyzer configured to analyze a driving state of the vehicle based on the driving information and determine whether at least one of an engine boosting control condition, a transmission cooling control condition, or a transmission warming control condition is satisfied;
an electric supercharger controller configured to start an operation of the dual-turbine electric supercharger when at least one of the engine boosting control condition, the transmission cooling control condition, or the transmission warming control condition is satisfied;
a valve controller configured to control a bypass valve to control an air flow connection to the engine-side supercharging path part or the transmission-side supercharging path part in synchronization with an operation time of the dual-turbine electric supercharger; and
an integrated controller configured to control operations of the driving state analyzer, the electric supercharger controller, and the valve controller.

15. A control method of a vehicle supercharging system that supplies air to an engine and a transmission by using a dual-turbine electric supercharger, the control method comprising:
determining, by a controller, whether an engine boosting control condition, a transmission cooling control condition, and a transmission warming control condition are satisfied based on a driving state of a vehicle;
in response to the engine boosting control condition being satisfied, operating, by the controller, the dual-turbine electric supercharger, and supplying air through an engine-side supercharging path part from an air supplying line to a first turbine of the dual-turbine electric supercharger, where the engine-side supercharging path part is branched out from the air supplying line; and
in response to the transmission cooling control condition or the transmission warming control condition being satisfied, operating, by the controller, the dual-turbine electric supercharger, and supplying air through a transmission-side supercharging path part to a second turbine of the dual-turbine electric supercharger.

16. The control method of claim 15, wherein:
the engine boosting control condition is satisfied when an increase rate of an operational signal of an accelerator pedal corresponds to a launch condition that exceeds a predetermined threshold or a re-acceleration condition while driving;
the transmission cooling control condition is satisfied when operational signals of the accelerator pedal and a brake pedal are repeated for a predetermined time or when a transmission temperature exceeds a threshold temperature while the vehicle is driven at a low speed; and
the transmission warming control condition is satisfied when an outside temperature when a cold starting of the vehicle is equal to or lower than a predetermined temperature, or when a transmission temperature when the cold starting of the vehicle is less than a temperature threshold.

17. The control method of claim 15, wherein
operating the dual-turbine electric supercharger, when the transmission cooling control condition or the transmission warming control condition is satisfied, includes:
controlling, by the controller, a bypass valve installed in the transmission-side supercharging path part to be opened, and controlling a bypass valve installed in the engine-side supercharging path part to be closed.

18. The control method of claim 15, further comprising:
in response to the engine boosting control condition and the transmission cooling or warming control condition being simultaneously satisfied, controlling a valve installed in the engine-side supercharging path part to be opened and a valve installed in the transmission-side supercharging path part to be opened.

19. A vehicle supercharging system, comprising:

an engine configured to generate power to drive a vehicle;

a transmission;

a dual-turbine electric supercharger configured to compress air by rotational force of a motor and including a first turbine and a second turbine;

an air cleaner filter configured to induce external air and including an engine-side air cleaner filter and a transmission-side air cleaner filter;

an engine-side supercharging path part that branches from an air supplying line connected to the engine-side air cleaner filter and passes through the dual-turbine electric supercharger, and then is again connected to the air supplying line;

a transmission-side supercharging path part that is connected to the transmission-side air cleaner filter, passes through the dual-turbine electric supercharger, and then is connected to the transmission; and a controller that operates the dual-turbine electric supercharger based on a driving state of the vehicle and that individually controls the engine-side supercharging path part for boosting the engine and the transmission-side supercharging path part for cooling or warming the transmission through control of valves provided in the engine-side supercharging path part and the transmission-side supercharging path part.

20. The vehicle supercharging system of claim 19, further comprising:

an integrated cooler configured to cool air that flows through the air supplying line connected to the engine-side supercharging path part and the transmission-side supercharging path part connected to the transmission.

\* \* \* \* \*